US011093692B2

(12) United States Patent
Yeo et al.

(10) Patent No.: US 11,093,692 B2
(45) Date of Patent: Aug. 17, 2021

(54) EXTRACTING AUDIOVISUAL FEATURES FROM DIGITAL COMPONENTS

(71) Applicant: GOOGLE LLC, Mountain View, CA (US)

(72) Inventors: Boon-Lock Yeo, Los Altos Hills, CA (US); Xuemei Gu, Mountain View, CA (US); Gangjiang Li, Shanghai (CN); Gaurav Bhaya, Sunnyvale, CA (US); Robert Stets, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/638,304

(22) Filed: Jun. 29, 2017

(65) Prior Publication Data

US 2018/0322103 A1    Nov. 8, 2018

Related U.S. Application Data

(63) Continuation-in-part of application No. 15/190,897, filed on Jun. 23, 2016, now Pat. No. 10,586,127, (Continued)

(51) Int. Cl.
*G06F 40/134* (2020.01)
*G06K 9/00* (2006.01)
(Continued)

(52) U.S. Cl.
CPC .......... *G06F 40/134* (2020.01); *G06F 16/434* (2019.01); *G06F 16/583* (2019.01);
(Continued)

(58) Field of Classification Search
CPC .... G06F 21/33; G06F 21/606; G06F 21/6245; G06F 40/134; G06F 16/434;
(Continued)

(56) References Cited

U.S. PATENT DOCUMENTS 5,418,713 A    5/1995 Allen
5,498,002 A    3/1996 Gechter
(Continued)

FOREIGN PATENT DOCUMENTS

EP    0 408 348 A2    1/1991
JP    2007-072712 A    3/2007
(Continued)

OTHER PUBLICATIONS

"CrunchBase ScanScout," [online] [Retrieved on Mar. 11, 2011]; Retrieved from the Internet URL: http://www.crunchbase.com/company/ScanScout; 3 pages.
(Continued)

*Primary Examiner* — Philip J Chea
*Assistant Examiner* — Mohammed Ahmed
(74) *Attorney, Agent, or Firm* — Foley & Lardner LLP

(57) ABSTRACT

Systems and methods for extracting audiovisual features from images and other digital components. A data processing system can extract image data and image features from an input image. The data processing system can match the image features to the image features of a plurality of image to identify candidate images. A second image can be selected from the candidate images based on a request that the data processing system received with the input image.

20 Claims, 11 Drawing Sheets

Related U.S. Application Data which is a continuation of application No. 13/295,507, filed on Nov. 14, 2011, now abandoned, which is a continuation-in-part of application No. 15/395,689, filed on Dec. 30, 2016.

(51) Int. Cl.

| | | |
|---|---|---|
| *G06F 16/432* | (2019.01) | |
| *G06F 16/583* | (2019.01) | |
| *G06F 40/279* | (2020.01) | |
| *G06K 9/46* | (2006.01) | |
| *G06K 9/62* | (2006.01) | |

(52) U.S. Cl.
CPC ....... *G06F 40/279* (2020.01); *G06K 9/00087* (2013.01); *G06K 9/46* (2013.01); *G06K 9/6201* (2013.01)

(58) Field of Classification Search
CPC . G06F 16/583; G06F 40/279; H04L 63/0428; G06K 9/00087
See application file for complete search history.

(56) References Cited

U.S. PATENT DOCUMENTS

| | | | |
|---|---|---|---|
| 5,572,643 A | 11/1996 | Judson | |
| 5,602,565 A | 2/1997 | Takeuchi | |
| 5,634,850 A | 6/1997 | Kitahara et al. | |
| 5,682,511 A | 10/1997 | Sposato et al. | |
| 5,748,173 A | 5/1998 | Gur | |
| 5,774,664 A | 6/1998 | Hidary et al. | |
| 5,778,181 A | 7/1998 | Hidary et al. | |
| 5,831,591 A | 11/1998 | Suh | |
| 5,845,263 A | 12/1998 | Camaisa et al. | |
| 5,856,821 A | 1/1999 | Funahashi | |
| 6,011,537 A | 1/2000 | Slotznick | |
| 6,018,768 A | 1/2000 | Ullman et al. | |
| 6,026,373 A | 2/2000 | Goodwin, III | |
| 6,185,558 B1 | 2/2001 | Bowman et al. | |
| 6,199,060 B1 | 3/2001 | Gustman | |
| 6,275,806 B1 | 8/2001 | Pertrushin | |
| 6,320,602 B1 | 11/2001 | Burkardt et al. | |
| 6,505,169 B1 | 1/2003 | Bhagavath et al. | |
| 6,510,553 B1 | 1/2003 | Hazra | |
| 6,570,587 B1 | 5/2003 | Efrat et al. | |
| 6,591,247 B2 | 7/2003 | Stern | |
| 6,642,940 B1 | 11/2003 | Dakss et al. | |
| 6,684,249 B1 | 1/2004 | Frerichs et al. | |
| 6,823,495 B1 | 11/2004 | Vedula et al. | |
| 6,857,007 B1 | 2/2005 | Bloomfield | |
| 6,947,531 B1 | 9/2005 | Lewis et al. | |
| 7,124,101 B1 | 10/2006 | Mikurak | |
| 7,158,676 B1 | 1/2007 | Rainsford | |
| 7,302,254 B2 | 11/2007 | Valloppillil | |
| 7,526,786 B1 | 4/2009 | Adams et al. | |
| 7,647,242 B2 | 1/2010 | Bem | |
| 7,660,815 B1 | 2/2010 | Scofield et al. | |
| 7,668,821 B1 | 2/2010 | Donsbach et al. | |
| 7,831,472 B2 | 11/2010 | Yufik | |
| 7,853,255 B2 | 12/2010 | Karaoguz et al. | |
| 7,979,459 B2 | 7/2011 | Wu et al. | |
| 8,065,611 B1 | 11/2011 | Chan et al. | |
| 8,073,868 B2 | 12/2011 | Lavi | |
| 8,090,222 B1* | 1/2012 | Baluja .................. | G06F 16/951 382/305 |
| 8,108,253 B2 | 1/2012 | Poon et al. | |
| 8,126,766 B2 | 2/2012 | Alexander | |
| 8,135,619 B2 | 3/2012 | Bem | |
| 8,195,133 B2 | 6/2012 | Ramer et al. | |
| 8,301,499 B2 | 10/2012 | Moissinac et al. | |
| 8,386,386 B1 | 2/2013 | Zhu | |
| 8,391,618 B1 | 3/2013 | Chuang et al. | |
| 8,463,783 B1 | 6/2013 | Yagnik | |
| 8,583,471 B1 | 11/2013 | Voskuhl et al. | |
| 8,688,514 B1 | 4/2014 | Sarkar et al. | |
| 8,903,716 B2 | 12/2014 | Chen et al. | |
| 9,189,514 B1 | 11/2015 | Myslinski | |
| 9,304,738 B1 | 4/2016 | Xu et al. | |
| 9,535,887 B2 | 1/2017 | Ozgul | |
| 9,875,740 B1 | 1/2018 | Kumar et al. | |
| 9,959,129 B2 | 5/2018 | Kannan et al. | |
| 10,056,078 B1 | 8/2018 | Shepherd et al. | |
| 10,068,573 B1 | 9/2018 | Aykac et al. | |
| 10,276,170 B2 | 4/2019 | Gruber et al. | |
| 10,417,037 B2 | 9/2019 | Gruber et al. | |
| 10,565,256 B2* | 2/2020 | Badr .................. | G06F 16/9032 |
| 2001/0045948 A1 | 11/2001 | Shiiyama | |
| 2002/0032603 A1 | 3/2002 | Yeiser | |
| 2002/0045988 A1 | 4/2002 | Yokota | |
| 2002/0053078 A1 | 5/2002 | Holtz et al. | |
| 2002/0065722 A1 | 5/2002 | Hubbard et al. | |
| 2002/0133571 A1* | 9/2002 | Jacob .................. | G06Q 30/02 709/219 |
| 2003/0018541 A1 | 1/2003 | Nohr | |
| 2003/0028873 A1* | 2/2003 | Lemmons .......... | H04N 7/17318 725/36 |
| 2003/0033161 A1 | 2/2003 | Walker et al. | |
| 2003/0040957 A1 | 2/2003 | Rodriguez et al. | |
| 2003/0074662 A1 | 4/2003 | Istvan et al. | |
| 2003/0187844 A1 | 10/2003 | Li et al. | |
| 2004/0044569 A1 | 3/2004 | Roberts et al. | |
| 2004/0260621 A1 | 12/2004 | Foster et al. | |
| 2005/0125683 A1* | 6/2005 | Matsuyama ............ | G06F 21/33 713/189 |
| 2005/0187823 A1 | 8/2005 | Howes | |
| 2005/0188400 A1 | 8/2005 | Topel | |
| 2005/0220439 A1 | 10/2005 | Carton et al. | |
| 2005/0261968 A1 | 11/2005 | Randall et al. | |
| 2005/0288096 A1 | 12/2005 | Walker et al. | |
| 2006/0004627 A1* | 1/2006 | Baluja ................ | H04M 3/4878 705/14.4 |
| 2006/0064411 A1 | 3/2006 | Gross et al. | |
| 2006/0247999 A1 | 11/2006 | Gonen et al. | |
| 2006/0293995 A1 | 12/2006 | Borgs et al. | |
| 2007/0094042 A1 | 4/2007 | Ramer et al. | |
| 2007/0094081 A1 | 4/2007 | Yruski et al. | |
| 2007/0097975 A1 | 5/2007 | Rakers et al. | |
| 2007/0123222 A1 | 5/2007 | Cox et al. | |
| 2007/0127688 A1 | 6/2007 | Doulton | |
| 2007/0174258 A1* | 7/2007 | Jones .................... | G06Q 30/02 |
| 2007/0288309 A1 | 12/2007 | Haberman et al. | |
| 2008/0021953 A1 | 1/2008 | Gil | |
| 2008/0060001 A1 | 3/2008 | Logan et al. | |
| 2008/0066107 A1 | 3/2008 | Moonka et al. | |
| 2008/0086368 A1 | 4/2008 | Bauman et al. | |
| 2008/0091537 A1 | 4/2008 | Miller et al. | |
| 2008/0107404 A1 | 5/2008 | Nakamura et al. | |
| 2008/0109306 A1 | 5/2008 | Maigret et al. | |
| 2008/0120276 A1 | 5/2008 | Chennavasin | |
| 2008/0172422 A1 | 7/2008 | Li et al. | |
| 2008/0187279 A1 | 8/2008 | Gilley et al. | |
| 2008/0201220 A1 | 8/2008 | Broder et al. | |
| 2008/0222132 A1 | 9/2008 | Pan et al. | |
| 2008/0235087 A1 | 9/2008 | Amento et al. | |
| 2008/0243821 A1 | 10/2008 | Delli Santi et al. | |
| 2008/0263583 A1 | 10/2008 | Heath | |
| 2008/0268876 A1* | 10/2008 | Gelfand ................ | G06Q 30/02 455/457 |
| 2008/0270538 A1 | 10/2008 | Garg et al. | |
| 2008/0281684 A1 | 11/2008 | Stefanik et al. | |
| 2008/0319844 A1 | 12/2008 | Hua et al. | |
| 2009/0163227 A1 | 6/2009 | Collins | |
| 2009/0179900 A1 | 7/2009 | Petrovic et al. | |
| 2009/0254971 A1 | 10/2009 | Herz et al. | |
| 2009/0265236 A1 | 10/2009 | Schultz et al. | |
| 2009/0307013 A1 | 12/2009 | Altounian et al. | |
| 2009/0324107 A1* | 12/2009 | Walch .................. | G06K 9/00872 382/224 |
| 2010/0094686 A1 | 4/2010 | Henshaw et al. | |
| 2010/0104145 A1 | 4/2010 | Momosaki | |
| 2010/0111196 A1* | 5/2010 | Lynch .................... | H04N 19/61 375/240.26 |
| 2010/0287056 A1 | 11/2010 | Koningstein et al. | |

(56) References Cited

U.S. PATENT DOCUMENTS

| | | |
|---|---|---|
| 2010/0290699 A1 | 11/2010 | Adam et al. |
| 2011/0161130 A1 | 6/2011 | Whalin et al. |
| 2011/0208822 A1 | 8/2011 | Rathod |
| 2011/0238500 A1 | 9/2011 | Kim |
| 2011/0246027 A1* | 10/2011 | Miyajima .......... G01C 21/3647 701/41 |
| 2011/0246285 A1 | 10/2011 | Ratnaparkhi et al. |
| 2011/0295847 A1 | 12/2011 | Cucerzan et al. |
| 2012/0054015 A1 | 3/2012 | Wu |
| 2012/0059713 A1 | 3/2012 | Galas et al. |
| 2012/0072280 A1 | 3/2012 | Lin |
| 2012/0095828 A1 | 4/2012 | Evankovich et al. |
| 2012/0105868 A1* | 5/2012 | Nomura ................ G01B 11/25 356/610 |
| 2012/0150657 A1 | 6/2012 | Rubinstein et al. |
| 2012/0159620 A1 | 6/2012 | Seifert et al. |
| 2012/0224768 A1 | 9/2012 | Lee |
| 2012/0265528 A1 | 10/2012 | Gruber et al. |
| 2012/0265761 A1 | 10/2012 | Atsmon et al. |
| 2012/0290566 A1* | 11/2012 | Dasher .................. G06F 16/50 707/723 |
| 2012/0294520 A1* | 11/2012 | Mei ..................... G06F 16/434 382/164 |
| 2013/0091453 A1 | 4/2013 | Kotler et al. |
| 2013/0117022 A1 | 5/2013 | Chen et al. |
| 2013/0120544 A1* | 5/2013 | Du ..................... H04N 13/161 348/51 |
| 2013/0268507 A1 | 10/2013 | MacBeth et al. |
| 2013/0272570 A1 | 10/2013 | Sheng et al. |
| 2013/0275164 A1 | 10/2013 | Gruber et al. |
| 2013/0290172 A1 | 10/2013 | Mashinsky |
| 2013/0304758 A1 | 11/2013 | Gruber et al. |
| 2013/0318089 A1 | 11/2013 | Tan et al. |
| 2014/0222436 A1 | 8/2014 | Binder et al. |
| 2014/0278411 A1 | 9/2014 | Cheung |
| 2014/0278528 A1 | 9/2014 | Simha et al. |
| 2014/0280015 A1 | 9/2014 | Marantz et al. |
| 2014/0324851 A1 | 10/2014 | Tholiya et al. |
| 2014/0351241 A1 | 11/2014 | Leask et al. |
| 2014/0351261 A1 | 11/2014 | Aswani et al. |
| 2015/0161147 A1 | 6/2015 | Zhao et al. |
| 2015/0199731 A1 | 7/2015 | Jevtic et al. |
| 2015/0227504 A1 | 8/2015 | Zhang et al. |
| 2015/0256633 A1 | 9/2015 | Chand et al. |
| 2015/0278878 A1 | 10/2015 | Chau |
| 2015/0370914 A1 | 12/2015 | Carroll et al. |
| 2016/0063106 A1 | 3/2016 | Chai et al. |
| 2016/0104212 A1 | 4/2016 | Saligrama Ananthanarayana et al. |
| 2016/0210689 A1 | 7/2016 | Hummel |
| 2016/0212455 A1 | 7/2016 | Manna |
| 2016/0315995 A1 | 10/2016 | Hausler et al. |
| 2017/0024766 A1 | 1/2017 | Thomson et al. |
| 2017/0061515 A1 | 3/2017 | Hummel |
| 2017/0076316 A1 | 3/2017 | Heffernan et al. |
| 2017/0092278 A1 | 3/2017 | Evermann et al. |
| 2017/0110130 A1 | 4/2017 | Sharifi et al. |
| 2017/0110144 A1 | 4/2017 | Sharifi et al. |
| 2017/0132019 A1 | 5/2017 | Karashchuk et al. |
| 2017/0178686 A1 | 6/2017 | Li et al. |
| 2017/0323230 A1 | 11/2017 | Bailey et al. |
| 2017/0358301 A1 | 12/2017 | Raitio et al. |
| 2018/0040020 A1 | 2/2018 | Kurian et al. |
| 2018/0097940 A1 | 4/2018 | Beilis et al. |
| 2018/0277113 A1 | 9/2018 | Hartung et al. |
| 2018/0300745 A1 | 10/2018 | Aubespin et al. |

FOREIGN PATENT DOCUMENTS

| | | |
|---|---|---|
| JP | 2009-048446 A | 3/2009 |
| JP | 2015-528140 | 9/2015 |
| KR | 10-2000-0017807 A | 4/2000 |
| WO | WO-02/37470 | 5/2002 |
| WO | WO-02/080555 A2 | 10/2002 |
| WO | WO-2011/088053 A2 | 7/2011 |
| WO | WO-2018/125299 A1 | 7/2018 |

OTHER PUBLICATIONS

"Introducing Adap.tv for Advertisers," [online][Retrieved on Mar. 11, 2011]; Retrieved from the internet URL: http://www.adap.tv/demo.html; 1 page.

"MeToday Jul. 4, 2007," [online] [Retrieved on Mar. 11, 2011]; Retrieved from the Internet, URL: http://www.viddler.com/explore/djsteen/videos/27/; 1 page.

"Ooyala Blog: Create the Group," [online][Retrieved on Mar. 11, 2011]; Retrieved from the Internet URL: http//www.ooyala.com/blog; 11 pages.

"Walmart and Google to offer voice-enabled shopping", BBC News, Aug. 23, 2017.

"What's Hot on Shopping.com," [online][Retrieved on Mar. 11, 2011]; Retrieved from the Internet URL; shopping.com; 2 pages.

Amazon, "Echo Look | Hands-Free Camera and Style Assistant", reprinted from https://www.amazon.com/gp/product/B0186JAEWK?ref%5F=cm%5Fsw%5Fr%5Ffa%5Fdp%5Ft2%5FC5oazbJTKCB18&pldnSite=1 on Aug. 22, 2017 (7 pages).

Anonymous, "Microsoft for Digital Advertising Industry", PR Newswire, New York, Jan. 13, 2006, pp. 1-4. ProQuest Document ID 968489271.

Arrington, Michael, "Hulu Makes First Acquisition; Chinese Video Startup to Form Backbone of New Service," [online] [Retrieved on Mar. 11, 2011]; Retrieved from the Internet URL: http://www.techcrunch.com/2007/09/12/hulu-makes-first-acquisition-chinese-video-startup-to-form-backbone-of-new-service/; 6 pages.

Arrington, Michael, "TechCrunch—AdBrite Makes Brilliant Video Product," [online][Retrieved on Mar. 11, 2011]; Retrieved from the Internet URL: http://www.techcrunch.com/2007/1/4/adbrite-makes-brilliant-video-product; 12 pages.

Arrington, Michael, "TechCrunch—Cisco and Click.tv?," [online][Retrieved on Mar. 11, 2011]; Retrieved from the Internet URL: http;//www.techcrunch.com/2007/07/30/cisco-and-clicktv/; 4 pages.

Arrington, Michael, "TechCrunch—Click.tv Moves Video Ideas Forward," [online][Retrieved on Mar. 11, 2011] Retrieved from the Internet URL: http://www.techcrunch.com/2006/04/16/clicktv-moves-video-ideas-forward/; 6 pages.

Arrington, Michael, "TechCrunch—FuckedCompany's Adbrite Spawn Goes 2.0," [online][Retrieved on Mar. 11, 2011]; Retrieved from the Internet URL: http://www.techcrunch.com/2007/01/04/adbrite-makes-brilliant-video-product; 5 pages.

Asterpix Interactive Video, 'Introducing Hypervideo', [online] [retrieved on Nov. 26, 2007]. Retrieved from http://www.asterpix.com/help/learnmore/introducing/.

Broussard, Mitchel, "Chatbot-Like Siri Patent Includes Intelligent Image, Video, and Audio Recognition Within Messages", May 11, 2017, 11 pages.

Chen, Yilun Lulu, "Alibaba Challenges Google, Amazon With New Echo-Like Device", Bloomberg, Jul. 5, 2017, 3 pages.

Close, "Amazon Echo Will Give You These Deals If You Order Through Alexa This Weekend," Web Article, Nov. 18, 2016, Time.com (2 pages).

Clover, Juli, "Amazon and Google Want to Turn Their Smart Home Speakers Into Telephone Replacements", MacRumors, Feb. 15, 2017 (5 pages).

Collins, et al., "Can Twitter Save Itself?", cnet, Apr. 26, 2017, reprinted from https://www.cnet.com/news/twitter-q1-2017-earnings/ on Aug. 22, 2017 (2 pages).

Cook, "A Siri for advertising: These mobile ads talk back to you," Web Article, Apr. 1, 2013, Geekwire.com (7 pages).

Crist, Ry, "Logitech Harmony's Alexa Skill just got a whole lot better", cnet, Jul. 13, 2017 (2 pages).

CrunchBase Company Profile, 'ScanScout', Jul. 24, 2007 [online][retrieved on Nov. 26, 2007]. Retrieved from http://www.crunchbase.com/company/ScanScout.

(56) References Cited

OTHER PUBLICATIONS

Dominguez, C., 'BroadRamp technology will make TV shows virtual mall', San Antonio Business Journal, Jun. 11, 2007, [online] [retrieved on Nov. 26, 2007]. Retrieved from http://cincinnati.bizjournals.com/sanantonio/stories/2007/06/11story2.html?t=printable.
Dominguez, Catherine, "BroadRamp technology will make TV shows virtual mall", San Antonio Business Journal, The Essential Business Tool, Jun. 11, 2007, pp. 1-3, http://sanantonio.bizjournals.com/sanantonio/stories/2007/06/11/story3.html.
Dominguez, Catherine, "BroadRamp technology will make TV shows virtual mall." [online][Retrieved on Mar. 16, 2011]; Retrieved from the Internet URL: http//www.bizjournals.com/sanantonio/stories/2007/06/11/sotry3.html; 3 pages.
Foghorn Labs, 10 Tips to Improve the Performance of Google Product Listing Ads, printed from Internet address: http://www.foghornlabs.com/2012/11/21/product-listing-ads-best-practices/, on Mar. 18, 2013, 5 pages.
Forrest, Conner, "Essential Home wants to be 'bridge' between Amazon Alexa, Apple's Siri, and Google Assistant," TechRepublic, May 31, 2017, 9 pages.
Foxx, Chris, "Apple reveals HomePod smart speaker", BBC, Jun. 5, 2017, 9 pages.
Gebhart, Andrew, "Google Assistant is spreading, but it needs its own 'Echo Dot'", Cnet, May 20, 2017, 6 pages.
Gebhart, Andrew, "Google Home to the Amazon Echo: 'Anything you can do . . .'", cnet, May 18, 2017 (7 pages).
Gibbs, Samuel, "Your Facebook Messenger app is about to be filled with ads", The Guardian, Jul. 12, 2017 (3 pages).
Golgowski, Nina, "This Burger King Ad Is Trying to Control Your Google Home Device", Huffpost, Apr. 12, 2017 (7 pages).
Gonzalez, Nick, "TechCrunch—Video Ads: Every Startup Has a Different Solution," [online][Retrieved on Mar. 11, 2011]; Retrieved from the Internet URL: http://www.techcrunch.com/2007/07/06/video-ads-somebody-needs-to-solve-this-problem/; 8 pages.
Gonzalez, Nick, "TechCrunch—YuMe Closes $9 Million Series B," [online] [Retrieved on Mar. 16, 2011]: Retrieved from the Internet URL: http://techcrunch.com/2007/10/16/yume-closes-9-million-series-b/; 1 page.
Google Developers Newsletter "Google Assistant SDK", developers.google.com, retrieved on Jul. 12, 2017, 2 pages.
Google Inc., Products Feed Specification, printed from Internet address: http://www.support.google.com/merchants/bin/answer.py?hl=en&answer=188494#US, on Mar. 18, 2013, 6 pages.
Google Inc., Supported File Formats, printed from Internet address: http://www.support.google.com/merchants/bin/answer.py?hl=en&answer=160567, on Mar. 18, 2013, 1 page.
Gurma, Mark and Webb, Alex, "Apple Is Manufacturing a Siri Speaker to Outdo Google and Amazon", Bloomberg, May 31, 2017, 3 pages.
Hardwick, Tim, "Facebook Smart Speaker Coming Next Year With 15-inch Touch Panel", MacRumors, Jul. 25, 2017 (5 pages).
Hendrickson, Mark, "TechCrunch—Time Warner Invests in Video Ads Startup ScanScout", [online] [Retrieved on Mar. 11, 2011]; Retrieved from the Internet URL: http://www.techcrunch.com/2007/09/09/time-warner-backs-video-ads-through=scanscout/; 6 pages.
International Preliminary Report on Patentablity for PCT/US2008/084982 dated Jun. 10, 2010, 5 pages.
International Search Report and Written Opinion on PCT Application PCT/US2008/84982, dated Jun. 23, 2009, 8 pages.
Kelion, Leo, "Amazon's race to make Alexa smarter", BBC News, Jul. 28, 2017 (8 pages).
Koetsier, John, "Ads on Amazon Echo: Wendy's, ESPN, and Progressive Among Brands Testing", Forbes, May 11, 2017, 3 pages.
Larson, Selena, "Google Home now recognizes your individual voice", CNN Money, San Francisco, California, Apr. 20, 2017 (3 pages).
Lee, Dave, "The five big announcements from Google I/O", BBC, May 18, 2017, 11 pages.

Lund, Pamela, Mastering Google Product Feeds and Product Listing Ads—Part 1, found at http://www.blueglass.com/blog/mastering-google-product-feeds-and-product-listing-ads-part-1/#comments, Dec. 28, 2013, 17 pages.
Nieva, Richard, "Google Home and eBay can tell you how much that's worth", cnet, Mar. 8, 2017 (3 pages).
Notice of Allowance for U.S. Appl. No. 13/490,912, dated Jan. 7, 2014, 17 pages.
Ooyala, 'Overview', [online] [retrieved on Nov. 26, 2007]. Retrieved from http://www.ooyala.com/about.
Patently Apple, "Apple Patent Reveals a New Security Feature Coming to Siri", Apr. 4, 2017, reprinted from http://www.patentlyapple.com/patently-apple/2017/04/apple-patent-reveals-a-new-security-feature-coming-to-siri.html, on Aug. 22, 2017 (6 pages).
Patently Mobile, "The Patent behind Google Home's new Feature of Understanding Different Voices in the Home Surfaced Today", Apr. 20, 2017, reprinted from http://www.patentlymobile.com/2017/04/the-patent-behind-google-homes-new-feature-of-understanding-different-voices-in-the-home-surfaced-today.html, on Aug. 22, 2017 (3 pages).
Perez, Sarah, "The first ad network for Alexa Skills shuts down following Amazon's policy changes", Tech Crunch, Jun. 15, 2017, 8 pages.
Porter, Jon, "Amazon Echo Show release date, price, news and features", Tech Radar, Jun. 26, 2017, 11 pages.
Purcher, Jack, Today Google Home's Virtual Assistant can learn its Owner's voice for Security Reasons like Apple's Patent Pending Idea, Apr. 20, 2017, 4 pages.
Riley, Duncan, "TechCrunch—Contextual In-Video Advertising: ScanScout," [online] [Retrieved on Mar. 11, 2011]; Retrieved from the Internet URL: http://www.techcrunch.com/2007/0514/contextual-in-video=-advertising-scanscout/; 5 pages.
Sablich, Justin, "Planning a Trip With the Help of Google Home", New York Times, dated May 31, 2017, 6 pages.
Seifert, Dan, "Samsung's new virtual assistant will make using your phone easier", The Verge, Mar. 20, 2017 (6 pages).
Sherr, Ian, "IBM built a voice assistant for cybersecurity", cnet, Feb. 13, 2017 (2 pages).
Siegal, Daniel, "IP Attys Load Up Apps' Legal Challenges At 'Silicon Beach'", Law360, Los Angeles, California, Feb. 2, 2017 (4 pages).
Simonite, "How Alexa, Siri, and Google Assistant Will Make Money Off You," Web Article, May 31, 2016, technologyreview.com (11 pages).
Simonite, "How Assistant Could End Up Eating Google's Lunch," Web Article, Sep. 23, 2016, technologyreview.com (9 pages).
Smith, Dave, "The Amazon Echo got 2 incredibly useful features thanks to a new update", Business Insider, Jun. 1, 2017, 2 pages.
Techcrunch, 'Cisco and Click.tv?', Jul. 30, 2007, [online] [retrieved on Nov. 26, 2007]. Retrieved from http://www.techcrunch.com/2007/07/30/cisco-and-clicktv/.
Techcrunch, 'Hutu Makes First Acquisition; Chinese Video Startup to Form Backbone of New Service', Sep. 12, 2007, [online] [retrieved on Nov. 26, 2007]. Retrieved from http://www.techcrunch.com/2007/09/12/hulu-makes-first-acquisition-chinese-video-startup.
Techcrunch, 'Video Ads: Every Startup has a Different Solution', Jul. 6, 2007 [online][retrieved on Nov. 26, 2007]. Retrieved from http://www.techcrunch.com2007/07/06/video-ads-somebody-needs-to-solve-this-problem.
U.S. Notice of Allowance for U.S. Appl. No. 11/948,643, dated Feb. 27, 2012 (12 pages).
U.S. Notice of Allowance on U.S. Appl. No. 13/168,904, dated Jan. 10, 2014 (8 pages).
U.S. Notice of Allowance on U.S. Appl. No. 14/278473 dated Oct. 31, 2016.
U.S. Office Action dated Dec. 9, 2010, for U.S. Appl. No. 11/948,643 (20 pages).
U.S. Office Action for U.S. Appl. No. 13/490,912, dated Apr. 16, 2013, 31 pages.
U.S. Office Action for U.S. Appl. No. 13/490,912, dated Aug. 2, 2012, 25 pages.
U.S. Office Action for U.S. Appl. No. 13/295,507 dated May 10, 2013.

(56) References Cited

OTHER PUBLICATIONS

U.S. Office Action for U.S. Appl. No. 13/295,507 dated Oct. 30, 2013.
U.S. Office Action on U.S. Appl. No. 13/168,904 dated Aug. 7, 2013.
U.S. Office Action on U.S. Appl. No. 13/295,507 dated Jul. 23, 2015.
U.S. Office Action on U.S. Appl. No. 13/295,507 dated Mar. 24, 2016.
U.S. Office Action on U.S. Appl. No. 13/932,836 dated Aug. 16, 2017 (15 pages).
U.S. Office Action on U.S. Appl. No. 13/932,836 dated Feb. 12, 2015.
U.S. Office Action on U.S. Appl. No. 13/932,836 dated Jun. 24, 2015.
U.S. Office Action on U.S. Appl. No. 13/932,836 dated Apr. 12, 2017.
U.S. Office Action on U.S. Appl. No. 13/932,836 dated Jul. 8, 2016.
U.S. Office Action on U.S. Appl. No. 13/932,836 dated Nov. 16, 2015.
U.S. Office Action on U.S. Appl. No. 13/932,836 dated Nov. 2, 2016.
U.S. Office Action on U.S. Appl. No. 14/190,523 dated May 20, 2016.
U.S. Office Action on U.S. Appl. No. 14/190,523 dated Aug. 21, 2014.
U.S. Office Action on U.S. Appl. No. 14/190,523 dated Dec. 3, 2014.
U.S. Office Action on U.S. Appl. No. 14/190,523 dated Apr. 2, 2015.
U.S. Office Action on U.S. Appl. No. 14/190,523 dated Jun. 6, 2016.
U.S. Office Action on U.S. Appl. No. 14/190,523 dated Aug. 17, 2015.
U.S. Office Action on U.S. Appl. No. 14/190,523 dated Feb. 22, 2017.
U.S. Office Action on U.S. Appl. No. 14/190,523 dated May 26, 2015.
U.S. Office Action on U.S. Appl. No. 14/190,523 dated Nov. 25, 2015.
U.S. Office Action on U.S. Appl. No. 14/278,473 dated May 3, 2016.
U.S. Office Action on U.S. Appl. No. 14/278,473 dated Sep. 23, 2016.
U.S. Office Action on U.S. Appl. No. 15/584,40 dated Aug. 14, 2017 (15 pages).
Willens, Max, "For publishers, Amazon Alexa holds promise but not much money (yet)", Digiday, Jul. 6, 2017, 5 pages.
YuMe Networks, 'About Us', [online] [retrieved on Nov. 26, 2007]. Retrieved from http://yumenetworks.com/about.html.
Abrams, Help users find, interact & re-engage with your app on the Google Assistant, Google Developers Blog, Nov. 15, 2017, 16 pages.
Albrecht, "Alexa, How Can You Be Used in Restaurants?", the spoon, Dec. 10, 2017, 6 pages.
Barr, "AWS DeepLens—Get Hands-On Experience with Deep Learning With Our New Video Camera", AWS News Blog, Nov. 29, 2017, 11 pages.
Buckland et al., "Amazon's Alexa Takes Open-Source Route to Beat Google Into Cars", Bloomberg, Feb. 27, 2018, 6 pages.
Coberly, "Apple patent filing reveals potential whispering Siri functionality", Techspot, Dec. 14, 2017, 4 pages.
Estes, "Amazon's Newest Gadget Is a Tablet That's Also an Echo", Gizmodo, Sep. 19, 2017, 3 pages.
Heater, "Amazon Alexa devices can finally tell voices apart", TechCrunch, Oct. 11, 2017, 6 pages.
International Search Report and Written Opinion for PCT Appl. Ser. No. PCT/US2017/049713 dated Oct. 25, 2017, 12 pages.
Johnston, "Amazon Whirlwind: New Echo, Plus, Spot, Connect, Fire TV Take the Stage", Twice, Sep. 27, 2017, 4 pages.
Kelion, "Amazon revamps Echo smart speaker family", BBC News, Sep. 27, 2017, 11 pages.

Krishna, "Jim Beam's smart decanter will pour you a shot when you ask", engadget, Nov. 29, 2017, 3 pages.
Lacy, "Improving search and advertising are the next frontiers for voice-activated devices", TechCrunch, Dec. 20, 2017, 13 pages.
Lee, "Take Two for Samsung's troubled Bixby assistant", BBC News, Oct. 19, 2017, 6 pages.
Lund, Pamela, Mastering Google Product Feeds and Product Listing Ads $2013 Part 1, found at http://www.blueglass.com/blog/mastering-google-product-feeds-and-product-listing-ads-part-1/#comments, Dec. 28, 2013, 17 pages.
Novet, et al., "Amazon is getting ready to bring Alexa to wore", CNBC, Nov. 29, 2017, 4 pages.
Palladino, "Garmin teamed up with Amazon to make a tiny Echo Dot for your car", ars Technica, Oct. 17, 2017, 2 pages.
Perez, "Alexa's 'Routines' will combine smart home control with other actions, like delivering your news and weather", TechCrunch, Sep. 28, 2017, 10 pages.
Pringle, "'I'm sorry to hear that': Why training Siri to be a therapist won't be easy", CBC News, Sep. 24, 2017, 3 pages.
Unknown Author, "'Dolphin' attacks fool Amazon, Google voice assistants", BBC News, Sep. 7, 2017, 8 pages.
U.S. Notice of Allowance on U.S. Appl. No. 13/932,836 dated Dec. 18, 2017, 7 pages.
U.S. Notice of Allowance on U.S. Appl. No. 15/584,940 dated Feb. 26, 2018, 9 pages.
U.S. Notice of Allowance on U.S. Appl. No. 15/584,940 dated Jan. 30, 2018, 9 pages.
U.S. Office Action on U.S. Appl. No. 15/190,897 dated Dec. 7, 2017, 34 pages.
Communication pursuant to Article 94(3) EPC dated Feb. 22, 2019 for EP Application No. 17768558.3, 8 pages.
Final Office Action for U.S. Appl. No. 15/395,689 dated Mar. 22, 2019, 13 pages.
Final Office Action for U.S. Appl. No. 15/584,746 dated Apr. 2, 2019, 14 pages.
Non-Final Office Action for U.S. Appl. No. 15/190,897 dated Nov. 16, 2018, 39 pages.
Non-Final Office Action for U.S. Appl. No. 15/395,689 dated Sep. 13, 2018, 13 pages.
Non-Final Office Action for U.S. Appl. No. 15/584,746 dated Oct. 29, 2018, 14 pages.
Notice of Allowance for U.S. Appl. No. 15/190,897 dated May 6, 2019, 15 pages.
Notice of Reasons for Rejection for Japanese Application No. 2017-556891 dated Feb. 18, 2019, 13 pages.
Office Action for German Patent Application No. 11 2017 000 122.6 dated Sep. 5, 2018, 1 page.
Office Action for Korean Application No. 10-2017-7031189 dated Nov. 29, 2018, 63 pages.
U.S. Final Office Action for U.S. Appl. No. 14/190,523 dated May 7, 2018, 28 pages.
U.S. Final Office Action for U.S. Appl. No. 15/190,897 dated May 18, 2018, 33 pages.
Yamato, et al., "Ubiquitous Service Composition Technology for Ubiquitous Network Environments", NTT Network Service Systems Laboratories, NTT Corporation, vol. 48 No. 2, Feb. 2007, 16 pages.
International Preliminary Report on Patentability for Appl. Ser. No. PCT/US2017/049713 dated Jul. 11, 2019 (8 pages).
Non-Final Office Action on U.S. Appl. No. 15/395,689 dated Aug. 21, 2019, 13 pages.
Notice of Allowance on U.S. Appl. No. 15/190,897 dated Aug. 27, 2019, 14 pages.
Notice of Allowance on U.S. Appl. No. 15/584,746 dated Aug. 7, 2019, 8 pages.
U.S. Office Action for U.S. Appl. No. 15/638,324 dated Jul. 8, 2019 (27 pages).
U.S. Office Action for U.S. Appl. No. 15/638,333 dated Jun. 26, 2019 (19 pages).
Corrected Notice of Allowability for U.S. Appl. No. 15/395,689 dated Sep. 9, 2020 (2 pages).
Notice of Reasons for Rejection for JP Appln. Ser. No. 2019-135381 dated Aug. 17, 2020 (11 pages).

(56) References Cited

OTHER PUBLICATIONS

First Office Action for CN Appln. Ser. No. 201780001369.6 dated Jul. 3, 2020 (18 pages).
Non-Final Office Action for U.S. Appl. No. 15/638,333 dated Aug. 6, 2020 (25 pages).
Advisory Action for U.S. Appl. No. 15/638,333 dated Feb. 28, 2020 (4 pages).
Applicant Initiated Interview Summary for U.S. Appl. No. 15/638,324 dated Feb. 28, 2020 (5 pages).
Final Office Action for U.S. Appl. No. 15/395,689 dated Mar. 5, 2020 (14 pages).
Final Office Action for U.S. Appl. No. 15/638,333 dated Dec. 17, 2019 (19 pages).
Final Office Action for U.S. Appl. No. 15/638,324 dated Jan. 3, 2020 (29 pages).
Notice of Allowance for U.S. Appl. No. 13/168,904 dated Jan. 10, 2014 (8 pages).
Notice of Allowance for U.S. Appl. No. 15/190,897 dated Oct. 25, 2019 (16 pages).
Notice of Allowance for U.S. Appl. No. 15/584,746 dated Feb. 12, 2020 (5 pages).
Examination Report for EP Application Ser. No. 17768558.3 dated Apr. 3, 2020 (9 pages).
Examination Report for IN Appln. Ser. No. 201747045160 dated Apr. 28, 2020 (7 pages).
Non-Final Office Action for U.S. Appl. No. 15/638,324 dated Jul. 2, 2020 (35 pages).
Notice of Allowance for U.S. Appl. No. 15/395,689 dated Jul. 29, 2020 (7 pages).
Notice of Allowance for U.S. Appl. No. 15/584,746 dated Jul. 31, 2020 (5 pages).
Notice of Allowance for U.S. Appl. No. 15/395,689 dated Oct. 28, 2020 (7 pages).
Supplemental Notice of Allowability for U.S. Appl. No. 15/395,689 dated Jan. 6, 2021 (2 pages).
Decision of Rejection for JP Appln. Ser. No. 2019-135381 dated Mar. 1, 2021 (6 pages).
Final Office Action for U.S. Appl. No. 15/638,333 dated Jan. 28, 2021 (19 pages).
Notice of Allowance for U.S. Appl. No. 15/584,746 dated Feb. 11, 2021 (5 pages).
Final Office Action for U.S. Appl. No. 15/638,324 dated Jan. 26, 2021 (24 pages).
Second Office Action for CN Appln. Ser. No. 201780001369.6 dated Apr. 8, 2021 (7 pages).
Notice of Allowance for U.S. Appl. No. 15/638,324 dated Jun. 16, 2021 (13 pages).
Rubinstein et al., "A Life More Photographic; Mapping The Networked Image", Photographies, vol. 1, No. 1, Mar. 2008, doi:10.1080/17540760701785842 (22 pages).
Yardi et al., "Photo-Based Authentication Using Social Networks", WOSN '08 (Workshop on Online Social Networks), Aug. 18, 2008, retrieved Jun. 7, 2021 from URL: http://conferences.sigcomm.org/sigcomm/2008/workshops/wosn/papers/p55.pdf (5 pages).

\* cited by examiner

EXTRACTING AUDIOVISUAL FEATURES FROM DIGITAL COMPONENTS

CROSS-REFERENCE TO RELATED APPLICATIONS

The present application claims the benefit of priority under 35 U.S.C. § 120 as a continuation-in-part of U.S. patent application Ser. No. 15/190,897, filed Jun. 23, 2016, which claims the benefit of priority under 35 U.S.C. § 120 as a continuation of U.S. patent application Ser. No. 13/295, 507, filed Nov. 14, 2011. The application also claims the benefit of priority under 35 U.S.C. § 120 as a continuation-in-part of U.S. patent application Ser. No. 15/395,689, filed Dec. 30, 2016. Each of the foregoing applications are hereby incorporated by reference in their entirety.

BACKGROUND

Electronic online documents can include content elements. These content elements can be defined for presentation with or within a webpage. Text content of the webpage can be used to identify relevant content. However, some text content may not be relevant to the topic of the webpage. Furthermore, some webpages may lack text content.

BRIEF SUMMARY

At least one aspect is direct to a system to extract image features from input requests. The system can include a recognition engine that can be executed by a data processing system. The recognition engine can receive, from a computing device, a first request that can include a first image. The recognition engine can retrieve, from a data repository, image data for each of a plurality of images. The image data can include image features. The recognition engine can extract an image feature from the first image. The recognition engine can select candidate images from the plurality of images by determining matches between the image features of the plurality of images and the image feature from the first image. The recognition engine can select a second image from the candidate images based on the request. The system can also include a network interface of the data processing system to transmit the second image to the computing device.

At least one aspect is direct to a method to extract image features from input requests. The method can include receiving, from a computing device by a data processing system, a first request that can include a first image. The method can include retrieving, from a data repository by the data processing system, image data for each of a plurality of images. The image data can include image features. The method can include extracting, by a recognition engine executed by the data processing system, an image feature from the first image. The method can include selecting, by the data processing system, candidate images from the plurality of images by determining matches between the image features of the plurality of images and the image feature from the first image. The method can include selecting, by the data processing system, a second image from the candidate images based on the request. The method can include transmitting, via a network interface, the second image to the computing device.

At least one aspect is directed to a system for extracting audiovisual features from online document elements. A recognition engine executed on a data processing system having one or more processors can identify a first audiovisual content element on an online document, the first audiovisual content element including image data. The recognition can retrieve a second audiovisual content element from a content provider database, the second audiovisual content element including image data. The recognition engine can extract an image feature from the first audiovisual content element by applying an image feature detection to the image data of the first audiovisual content element. The recognition engine can extract an image feature from the second audiovisual content element by applying the image feature detection to the image data of the second audiovisual content element. The recognition engine can determine an image feature match between the image feature of the first audiovisual content element and the image feature of the second audiovisual content element. The recognition engine can select the second audiovisual content element for display by the client device on the online document based on the image feature match. The data processing system can transmit, via a network interface, the second audiovisual content element to the client device for insertion by the client device in a content slot of the online document, responsive to the selection of the second audiovisual content element.

At least one aspect is directed to a method of extracting audiovisual features from online document elements. A recognition engine executing on a data processing system having one or more processors can identify a first audiovisual content element on an online document, the first audiovisual content element including image data. The recognition can retrieve a second audiovisual content element from a content provider database, the second audiovisual content element including image data. The recognition engine can extract an image feature from the first audiovisual content element by applying an image feature detection to the image data of the first audiovisual content element. The recognition engine can extract an image feature from the second audiovisual content element by applying the image feature detection to the image data of the second audiovisual content element. The recognition engine can determine an image feature match between the image feature of the first audiovisual content element and the image feature of the second audiovisual content element. The recognition engine can select the second audiovisual content element for display by the client device on the online document based on the image feature match. The data processing system can transmit, via a network interface, the second audiovisual content element to the client device for insertion by the client device in a content slot of the online document, responsive to the selection of the second audiovisual content element.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS/FIGURES

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1A:
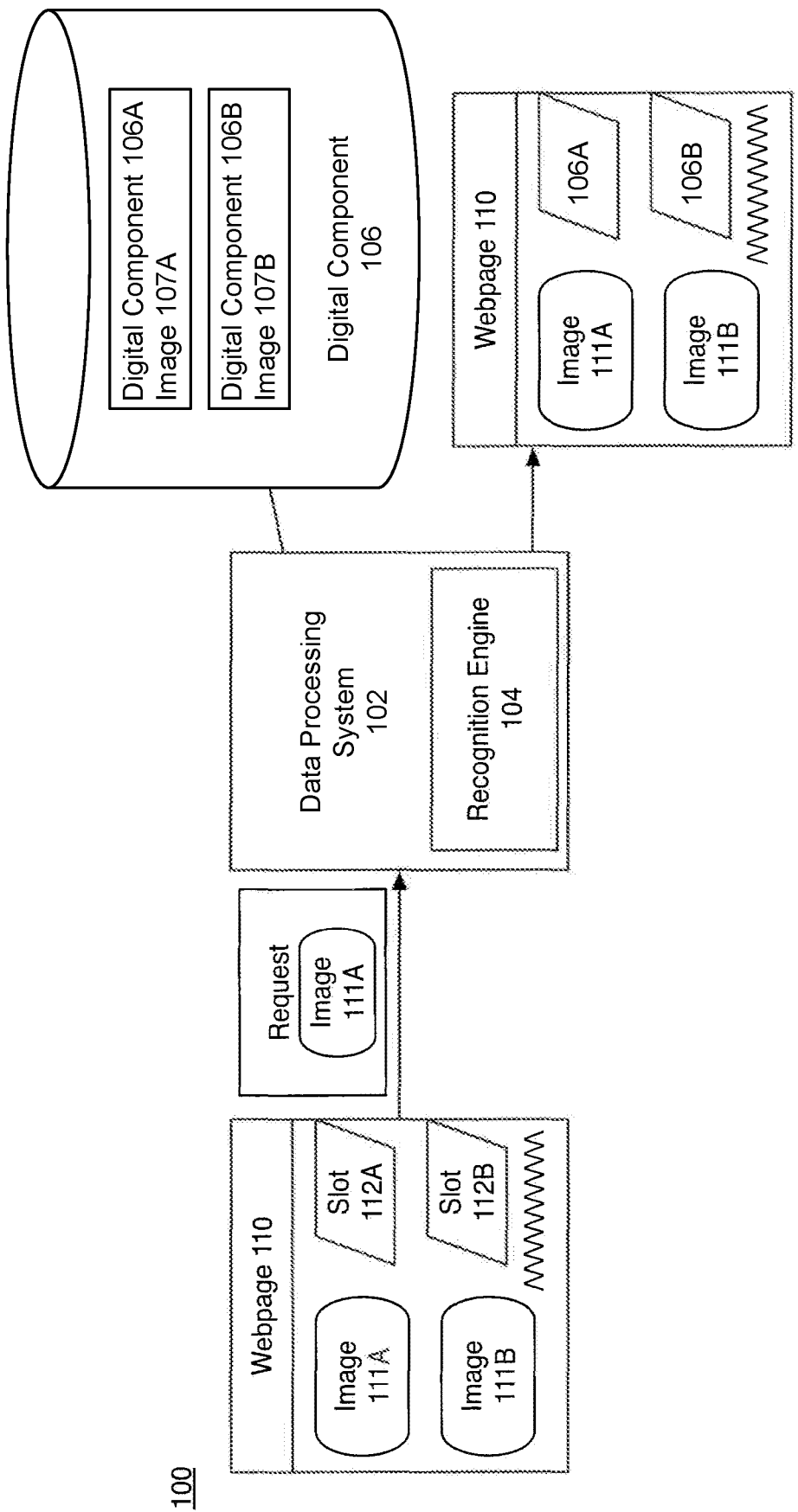
FIGS. 1A and 1B illustrate digital component selection examples.

Following below are more detailed descriptions of various concepts related to, and implementations of, methods, apparatuses, and systems of routing packetized actions via a computer network. The various concepts introduced above and discussed in greater detail below may be implemented in any of numerous ways.

The present disclosure is generally directed to improving the efficiency and effectiveness of information transmission and processing over disparate computing resources. It is challenging for disparate computing resource to efficiently process, and consistently and accurately parse audio-based instructions in a voice-based computing environment. For example, the disparate computing resources may not have access to the same voice models, or may have access to out of date or unsynchronized voice models that can make it challenging to accurately and consistently parse the audio-based instructions.

Systems and methods of the present disclosure are generally directed to a data processing system that routes packetized actions via a computer network. The data processing system can process the voice-based input using specifically voice models that are trained based on aggregate voice to parse the voice-based instructions and create an action data structure. The data processing system can transmit the action data structure to one or more component of the data processing system or third-party provider devices, which can also be referred to as service provider computing device, thereby allowing the third-party provider device to process the action data structure without having to process the voice-based input. By processing the voice-based input for a plurality of third-party provider devices, the data processing system can improve the reliability, efficiency, and accuracy with which voice-based instructions are processed and performed.

The present solution can reduce resource consumption, processor utilization, battery consumption, bandwidth utilization, size of an audio file, or amount of time consumed by a speaker by parsing voice-based instructions from an end user, constructing an action data structure using a template, and routing the action data structure to a corresponding third-party provider.

A digital component or a content item may refer to any form of communication in which one or more products, services, ideas, messages, people, organizations, or other items are identified and promoted or otherwise communicated. The digital components are not limited to commercial promotions or other communications. a digital component may be a public service announcement or any other type of notice, such as a broadcast or a public notice published in printed or electronic press. In some implementations, a digital component may be referred to or included in sponsored content. A digital component can include one or more content items. A digital component can be a content item. The digital component can be any type of digital file or document, such as a webpage, image file, video file, audio file, or action data structure.

Digital components (or promotional or digital content items generally) may be communicated via various mediums and in a number of forms. In some examples, digital components may be communicated through an interactive medium, such as the Internet, and may include graphical digital components (e.g., banner digital components), textual digital components, image digital components, audio digital components, video digital components, digital components combining one of more of the foregoing formats, or any form of electronically delivered digital component. Digital Components may include embedded information, such as embedded media, links, meta-information, and/or machine executable instructions. Digital Components also may be communicated through RSS (Really Simple Syndication) feeds, radio channels, television channels, print media, and other media.

The term "digital component" can refer to both a single "creative" and a "digital component group." A creative can refer to any entity that represents one digital component impression. a digital component impression can refer to any form of presentation of a digital component, such that the digital component is viewable or receivable by a user. In some examples, a digital component impression may occur when a digital component is displayed on a display device of a user access device. a digital component group can refer, for example, to an entity that represents a group of creatives that share a common characteristic, such as having the same digital component targeting criteria. Digital Component groups can be used to create a digital component campaign. For convenience, digital components, creatives, content items, and other digital content can be collectively referred to as "digital components" herein.

Digital Components may be included on resources provided by content provider computing devices, which can also be referred to as publisher computing devices. For example, a content provider computing device may specify one or more areas on a resource, such as a webpage, where digital components are to be displayed. A content provider computing device may also provide a resource such as an application to user devices, and may allow digital components to be displayed in the application. Relevant digital components may be identified based on text content included on the resource. Some resources include more multimedia content, such as image content, audio content, or video content, than text content. The text content may not be related to the multimedia content. Thus, irrelevant digital components may be provided. Further, certain resources include no text content. Embodiments identify relevant digital components based on multimedia content included on a resource provided by a content provider computing device.

Figure 1B:
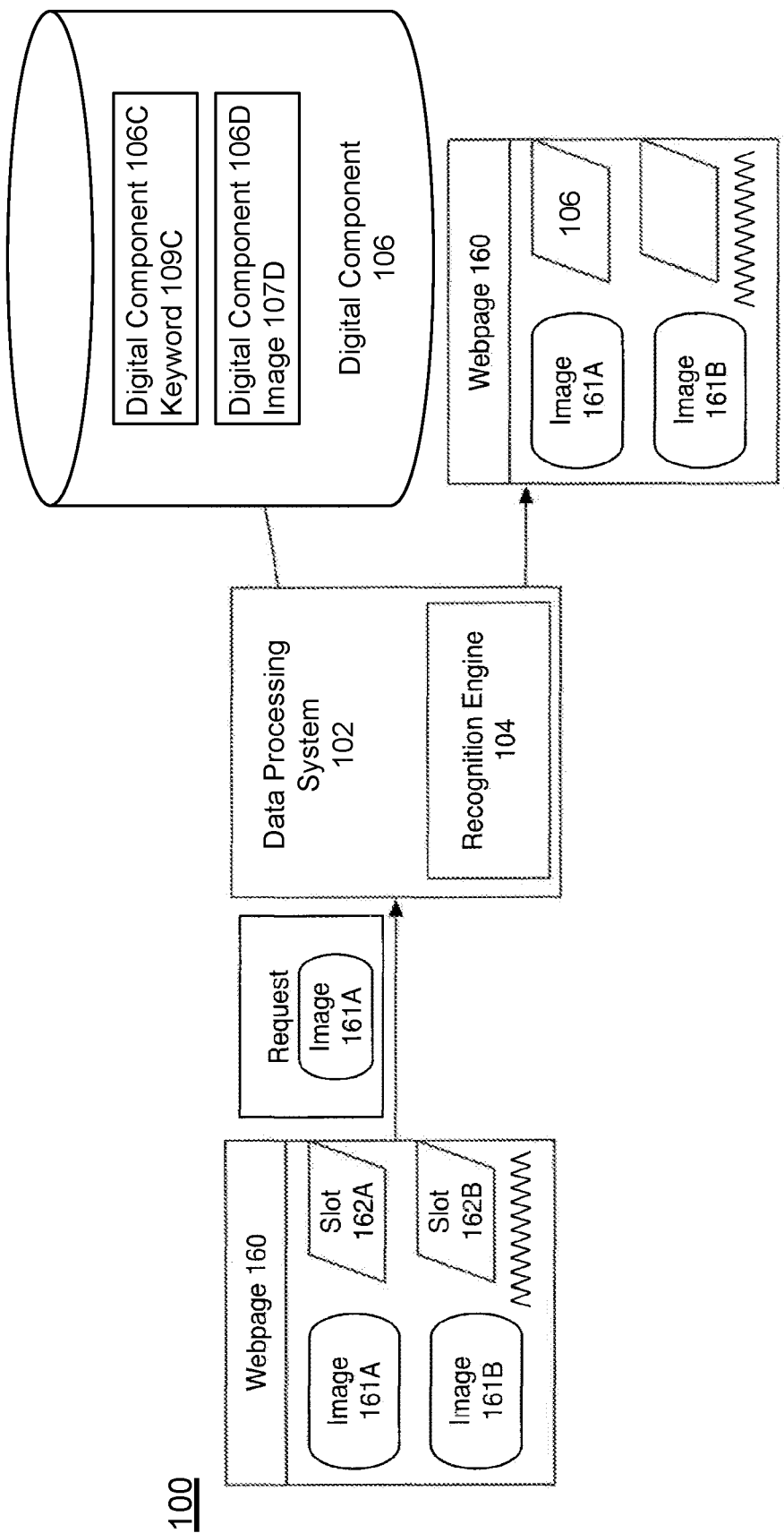
Figure 1C:
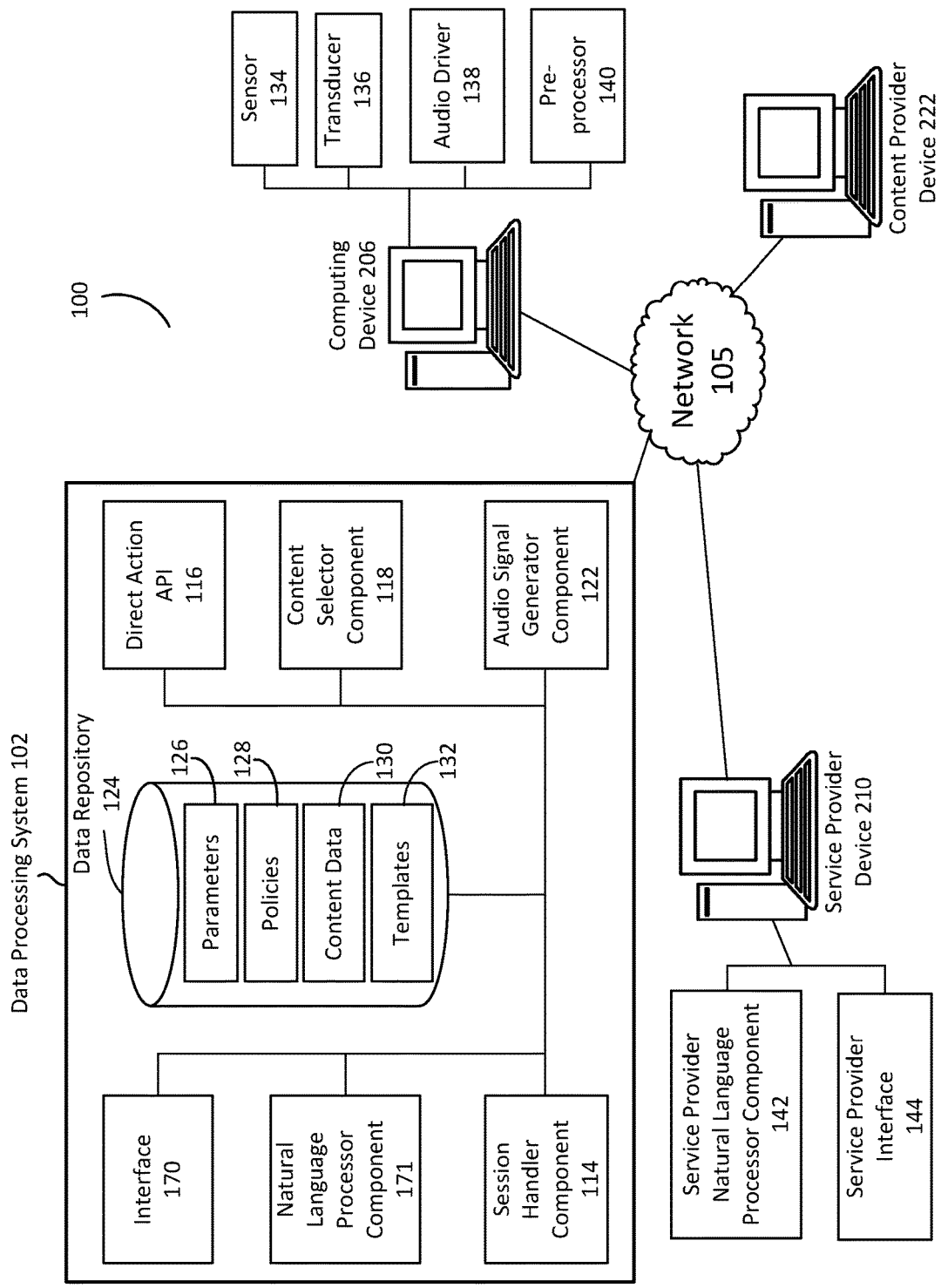
FIG. 1C is an illustration of a system to route packetized actions via a computer network.

FIGS. 1A-1C illustrate example 100 of providing digital components in response to multimedia content on a resource. In FIG. 1A, a user may request a content provider computing device resource, such as webpage 110. Webpage 110 includes one or more multimedia elements, such as image 111 and video 113. Webpage 110 may also include text content. Webpage 110 may also include one or more digital component slots 112A and 112B. When a user requests the content provider computing device webpage, a request for digital components may be sent to a data processing system 102, which accesses one or more digital components 106. Each digital component 106 may be associated with one or more digital component multimedia elements, which may include images, video data, or audio data. For example, digital component 106A is associated with digital component image 107. Digital Component 106B is can be associated with video content.

The data processing system 102 includes a recognition engine 104 Recognition engine 104 may recognize one or more features of image 111. In one embodiment, the images are sent with the request for digital components to the data processing system 102. In another embodiment, features associated with the images are sent to the data processing system 102. Further, recognition engine 104 may identify features that match between recognized features in image 111 and features of images associated with one or more digital components 106. For example, recognized features of image 111A may match features of digital component image 107. Image features may include, for example and without limitation, edges, corner features, interest points, blobs or regions of interest, or ridge features. Based on matching features between image 111 and the images associated with digital components 106, a relevant digital component may be identified and provided to the content provider computing device to be displayed on webpage 110 in one of the digital component slots 112A or 112B.

In FIG. 1B, a second user may request a second content provider computing device resource, such as webpage 160. webpage 160 includes one or more multimedia elements, such as video 161 and image 163, and may include text content. webpage 160 also includes one or more digital component slots 162A and 162B. When a user requests the webpage 160, a request for digital components may be sent to a data processing system 102, which accesses one or more digital components 106. Each digital component 106 may be associated with one or more digital component keywords. For example, digital component 106C is associated with digital component keyword 109C. Further, each digital component 106 may be associated with one or more text labels for a digital component multimedia element associated with a digital component. For example, digital component 106D may be associated with image 107D, which is associated with a text label.

In one embodiment, the multimedia elements are sent with the request for digital components to the data processing system 102. In another embodiment, text labels associated with the multimedia elements are sent to the data processing system 102. Recognition engine 104 may identify a text label associated with video 161. Text labels associated with images and multimedia elements may be, for example and without limitation, query terms input by a user, which resulted in the images or other multimedia elements being displayed to a user and selected by the user. Text labels may also include metadata associated with a multimedia element. Further, text labels or keywords associated with digital components 106, or text labels associated with multimedia elements associated with digital components 106 may be identified. For example, recognition engine 104 may identify keyword 109C as being responsive to a text label associated with video 161. For example, text label "daisy" can match keyword "daisy", or be identified as responsive to keyword "flower". Based on the identification of responsiveness, digital component 106C may be identified as a relevant digital component and provided to the content provider computing device to be displayed on webpage 160 in one of the digital component slots 162A or 162B.

FIG. 1C illustrates an example system 100 to route packetized actions via a computer network. The system 100 can include content selection infrastructure. The system 100 can include a data processing system 102. The data processing system 102 can communicate with one or more of a content provider computing device 106, service provider computing device 210, or client computing device 206 via a network 105. The network 105 can include computer networks such as the Internet, local, wide, metro, or other area networks, intranets, satellite networks, and other communication networks such as voice or data mobile telephone networks. The network 105 can be used to access information resources such as web pages, web sites, domain names, or uniform resource locators that can be presented, output, rendered, or displayed on at least one computing device 206, such as a laptop, desktop, tablet, personal digital assistant, smart phone, portable computers, or speaker. For example, via the network 105 a user of the computing device 206 can access information or data provided by a service provider 210 or content provider 106. The computing device 206 may or may not include a display; for example, the computing device may include limited types of user interfaces, such as a microphone and speaker. In some cases, the primary user interface of the computing device 206 may be a microphone and speaker.

The network 105 can include or constitute a display network, e.g., a subset of information resources available on the internet that are associated with a content placement or search engine results system, or that are eligible to include third-party content items as part of a content item placement campaign. The network 105 can be used by the data processing system 102 to access information resources such as web pages, web sites, domain names, or uniform resource locators that can be presented, output, rendered, or displayed by the client computing device 206. For example, via the network 105 a user of the client computing device 206 can access information or data provided by the content provider computing device 106 or the service provider computing device 210.

The network 105 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. The network 105 may include a wireless link, such as an infrared channel or satellite band. The topology of the network 105 may include a bus, star, or ring network topology. The network may include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). Different types of data may be transmitted via different protocols, or the same types of data may be transmitted via different protocols.

The system 100 can include data processing system 102. The data processing system 102 can include at least one logic device such as a computing device having a processor to communicate via the network 105, for example with the computing device 206, the content provider device 106 (content provider 106), or the service provider device 210 (or service provider 210). The data processing system 102 can include at least one computation resource, server, processor or memory. For example, the data processing system 102 can include a plurality of computation resources or servers located in at least one data center. The data processing system 102 can include multiple, logically-grouped servers and facilitate distributed computing techniques. The logical group of servers may be referred to as a data center, server farm or a machine farm. The servers can also be geographically dispersed. A data center or machine farm may be administered as a single entity, or the machine farm can include a plurality of machine farms. The servers within each machine farm can be heterogeneous—one or more of the servers or machines can operate according to one or more type of operating system platform.

Servers in the machine farm can be stored in high-density rack systems, along with associated storage systems, and located in an enterprise data center. For example, consolidating the servers in this way may improve system manageability, data security, the physical security of the system, and system performance by locating servers and high-performance storage systems on localized high-performance networks. Centralization of all or some of the data processing system 102 components, including servers and storage systems, and coupling them with advanced system management tools allows more efficient use of server resources, which saves power and processing requirements and reduces bandwidth usage.

The system 100 can include, access, or otherwise interact with at least one service provider device 210. The service provider device 210 can include at least one logic device such as a computing device having a processor to communicate via the network 105, for example with the computing device 206, the data processing system 102, or the content provider 106. The service provider device 210 can include at least one computation resource, server, processor or memory. For example, service provider device 210 can include a plurality of computation resources or servers located in at least one data center. The service provider device 210 can include one or more component or functionality of the data processing system 102.

The content provider computing device 106 can provide audio based content items for display by the client computing device 206 as an audio output content item. The content item can include an offer for a good or service, such as a voice based message that states: "Would you like me to order you a taxi?" For example, the content provider computing device 222 can include memory to store a series of audio content items that can be provided in response to a voice based query. The content provider computing device 106 can also provide audio based content items (or other content items) to the data processing system 102 where they can be stored in the data repository 124. The data processing system 102 can select the audio content items and provide (or instruct the content provider computing device 222 to provide) the audio content items to the client computing device 206. The audio based content items can be exclusively audio or can be combined with text, image, or video data.

The service provider device 210 can include, interface, or otherwise communicate with at least one service provider natural language processor component 142 and a service provider interface 144. The service provider computing device 210 can include at least one service provider natural language processor (NLP) component 142 and at least one service provider interface 144. The service provider NLP component 142 (or other components such as a direct action API of the service provider computing device 210) can engage with the client computing device 206 (via the data processing system 102 or bypassing the data processing system 102) to create a back-and-forth real-time voice or audio based conversation (e.g., a session) between the client computing device 206 and the service provider computing device 210. The service provider NLP 142 can include one or more function or feature as the NLP component 171 of the data processing system 102. For example, the service provider interface 144 can receive or provide data messages to the direct action API 116 of the data processing system 102. The service provider computing device 210 and the content provider computing device 106 can be associated with the same entity. For example, the content provider computing device 106 can create, store, or make available content items for a car sharing service, and the service provider computing device 210 can establish a session with the client computing device 206 to arrange for a delivery of a taxi or car of the car share service to pick up the end user of the client computing device 206. The data processing system 102, via the direct action API 116, the NLP component 171 or other components can also establish the session with the client computing device, including or bypassing the service provider computing device 210, to arrange for example for a delivery of a taxi or car of the car share service.

The computing device 206 can include, interface, or otherwise communicate with at least one sensor 134, transducer 136, audio driver 138, or pre-processor 140. The sensor 134 can include, for example, an ambient light sensor, proximity sensor, temperature sensor, accelerometer, gyroscope, motion detector, GPS sensor, location sensor, microphone, or touch sensor. The transducer 136 can include a speaker or a microphone. The audio driver 138 can provide a software interface to the hardware transducer 136. The audio driver can execute the audio file or other instructions provided by the data processing system 102 to control the transducer 136 to generate a corresponding acoustic wave or sound wave. The pre-processor 140 can be configured to detect a keyword and perform an action based on the keyword. The pre-processor 140 can filter out one or more terms or modify the terms prior to transmitting the terms to the data processing system 102 for further processing. The pre-processor 140 can convert the analog audio signals detected by the microphone into a digital audio signal, and transmit one or more data packets carrying the digital audio signal to the data processing system 102 via the network 105. In some cases, the pre-processor 140 can transmit data packets carrying some or all of the input audio signal responsive to detecting an instruction to perform such transmission. The instruction can include, for example, a trigger keyword or other keyword or approval to transmit data packets that can include the input audio signal to the data processing system 102.

The client computing device 206 can be associated with an end user that enters voice queries as audio input into the client computing device 206 (via the sensor 134) and receives audio output in the form of a computer generated voice that can be provided from the data processing system 102 (or the content provider computing device 106 or the service provider computing device 210) to the client computing device 206, output from the transducer 136 (e.g., a speaker). The computer generated voice can include recordings from a real person or computer generated language.

The data repository 124 can include one or more local or distributed databases, and can include a database management system. The data repository 124 can include computer data storage or memory and can store one or more parameters 126, one or more policies 128, content data 130, or templates 132 among other data. The parameters 126, policies 128, and templates 132 can include information such as rules about a voice based session between the client computing device 206 and the data processing system 102 (or the service provider computing device 210). The content data 130 can include content items for audio output or associated metadata, as well as input audio messages that can be part of one or more communication sessions with the client computing device 206.

The data processing system 102 can include a content placement system having at least one computation resource or server. The data processing system 102 can include, interface, or otherwise communicate with at least one interface 170. The data processing system 102 can include, interface, or otherwise communicate with at least one natural language processor component 171. The data processing system 102 can include, interface, or otherwise communicate with at least one direct action application programming interface ("API") 116. The data processing system 102 can include, interface, or otherwise communicate with at least one session handler 114. The data processing system 102 can include, interface, or otherwise communicate with at least one content selector component 118. The data processing system 102 can include, interface, or otherwise communicate with at least one audio signal generator 122. The data processing system 102 can include, interface, or otherwise communicate with at least one data repository 124. The at least one data repository 124 can include or store, in one or more data structures or databases, parameters 126, policies 128, content data 130, or templates 132. Parameters 126 can include, for example, thresholds, distances, time intervals, durations, scores, or weights. Content data 130 can include, for example, content campaign information, content groups, content selection criteria, content item objects or other information provided by a content provider 106 or obtained or determined by the data processing system to facilitate content selection. The content data 130 can include, for example, historical performance of a content campaign.

The interface 170, natural language processor component 171, session handler 114, direct action API 116, content selector component 118, or audio signal generator component 122 can each include at least one processing unit or other logic device such as programmable logic array engine, or module configured to communicate with the database repository or database 124. The interface 170, natural language processor component 171, session handler 114, direct action API 116, content selector component 118, audio signal generator component 122 and data repository 124 can be separate components, a single component, or part of the data processing system 102. The system 100 and its components, such as a data processing system 102, can include hardware elements, such as one or more processors, logic devices, or circuits.

The data processing system 102 can obtain anonymous computer network activity information associated with a plurality of computing devices 206. A user of a computing device 206 can affirmatively authorize the data processing system 102 to obtain network activity information corresponding to the user's computing device 206. For example, the data processing system 102 can prompt the user of the computing device 206 for consent to obtain one or more types of network activity information. The identity of the user of the computing device 206 can remain anonymous and the computing device 206 can be associated with a unique identifier (e.g., a unique identifier for the user or the computing device provided by the data processing system or a user of the computing device). The data processing system can associate each observation with a corresponding unique identifier.

A content provider 106 can establish an electronic content campaign. The electronic content campaign can be stored as content data 130 in data repository 124. An electronic content campaign can refer to one or more content groups that correspond to a common theme. A content campaign can include a hierarchical data structure that includes content groups, content item data objects, and content selection criteria. To create a content campaign, content provider 106 can specify values for campaign level parameters of the content campaign. The campaign level parameters can include, for example, a campaign name, a preferred content network for placing content item objects, a value of resources to be used for the content campaign, start and end dates for the content campaign, a duration for the content campaign, a schedule for content item object placements, language, geographical locations, type of computing devices on which to provide content item objects. In some cases, an impression can refer to when a content item object is fetched from its source (e.g., data processing system 102 or content provider 106), and is countable. In some cases, due to the possibility of click fraud, robotic activity can be filtered and excluded, as an impression. Thus, in some cases, an impression can refer to a measurement of responses from a Web server to a page request from a browser, which is filtered from robotic activity and error codes, and is recorded at a point as close as possible to opportunity to render the content item object for display on the computing device 206. In some cases, an impression can refer to a viewable or audible impression; e.g., the content item object is at least partially (e.g., 20%, 30%, 30%, 40%, 50%, 60%, 70%, or more) viewable on a display device of the client computing device 206, or audible via a speaker 136 of the computing device 206. A click or selection can refer to a user interaction with the content item object, such as a voice response to an audible impression, a mouse-click, touch interaction, gesture, shake, audio interaction, or keyboard click. A conversion can refer to a user taking a desired action with respect to the content item objection; e.g., purchasing a product or service, completing a survey, visiting a physical store corresponding to the content item, or completing an electronic transaction.

The content provider 106 can further establish one or more content groups for a content campaign. A content group includes one or more content item objects and corresponding content selection criteria, such as keywords, words, terms, phrases, geographic locations, type of computing device, time of day, interest, topic, or vertical. Content groups under the same content campaign can share the same campaign level parameters, but may have tailored specifications for particular content group level parameters, such as keywords, negative keywords (e.g., that block placement of the content item in the presence of the negative keyword on main content), bids for keywords, or parameters associated with the bid or content campaign.

To create a new content group, the content provider can provide values for the content group level parameters of the content group. The content group level parameters include, for example, a content group name or content group theme, and bids for different content placement opportunities (e.g., automatic placement or managed placement) or outcomes (e.g., clicks, impressions, or conversions). A content group name or content group theme can be one or more terms that the content provider 106 can use to capture a topic or subject matter for which content item objects of the content group is to be selected for display. For example, a car dealership can create a different content group for each brand of vehicle it carries, and may further create a different content group for each model of vehicle it carries. Examples of the content group themes that the car dealership can use include, for example, "Make A sports car" "Make B sports car," "Make C sedan," "Make C truck," "Make C hybrid," or "Make D hybrid." An example content campaign theme can be "hybrid" and include content groups for both "Make C hybrid" and "Make D hybrid", for example.

The content provider 106 can provide one or more keywords and content item objects to each content group. Keywords can include terms that are relevant to the product or services of associated with or identified by the content item objects. A keyword can include one or more terms or phrases. For example, the car dealership can include "sports car," "V-6 engine," "four-wheel drive," "fuel efficiency," as keywords for a content group or content campaign. In some cases, negative keywords can be specified by the content provider to avoid, prevent, block, or disable content placement on certain terms or keywords. The content provider can specify a type of matching, such as exact match, phrase match, or broad match, used to select content item objects.

The content provider 106 can provide one or more keywords to be used by the data processing system 102 to select a content item object provided by the content provider 106. The content provider 106 can identify one or more keywords to bid on, and further provide bid amounts for various keywords. The content provider 106 can provide additional content selection criteria to be used by the data processing system 102 to select content item objects. Multiple content providers 106 can bid on the same or different keywords, and the data processing system 102 can run a content selection process or ad auction responsive to receiving an indication of a keyword of an electronic message.

The content provider 106 can provide one or more content item objects for selection by the data processing system 102. The data processing system 102 (e.g., via content selector component 118) can select the content item objects when a content placement opportunity becomes available that matches the resource allocation, content schedule, maximum bids, keywords, and other selection criteria specified for the content group. Different types of content item objects can be included in a content group, such as a voice content item, audio content item, a text content item, an image content item, video content item, multimedia content item, or content item link. Upon selecting a content item, the data processing system 102 can transmit the content item object for rendering on a computing device 206 or display device of the computing device 206. Rendering can include displaying the content item on a display device, or playing the content item via a speaker of the computing device 206. The data processing system 102 can provide instructions to a computing device 206 to render the content item object. The data processing system 102 can instruct the computing device 206, or an audio driver 138 of the computing device 206, to generate audio signals or acoustic waves.

The data processing system 102 can include an interface component 170 designed, configured, constructed, or operational to receive and transmit information using, for example, data packets. The interface 170 can receive and transmit information using one or more protocols, such as a network protocol. The interface 170 can include a hardware interface, software interface, wired interface, or wireless interface. The interface 170 can facilitate translating or formatting data from one format to another format. For example, the interface 170 can include an application programming interface that includes definitions for communicating between various components, such as software components.

The data processing system 102 can include an application, script or program installed at the client computing device 206, such as an app to communicate input audio signals to the interface 170 of the data processing system 102 and to drive components of the client computing device to render output audio signals. The data processing system 102 can receive data packets or other signal that includes or identifies an audio input signal. For example, the data processing system 102 can execute or run the NLP component 171 to receive or obtain the audio signal and parse the audio signal. For example, the NLP component 171 can provide for interactions between a human and a computer. The NLP component 171 can be configured with techniques for understanding natural language and allowing the data processing system 102 to derive meaning from human or natural language input. The NLP component 171 can include or be configured with technique based on machine learning, such as statistical machine learning. The NLP component 171 can utilize decision trees, statistical models, or probabilistic models to parse the input audio signal. The NLP component 171 can perform, for example, functions such as named entity recognition (e.g., given a stream of text, determine which items in the text map to proper names, such as people or places, and what the type of each such name is, such as person, location, or organization), natural language generation (e.g., convert information from computer databases or semantic intents into understandable human language), natural language understanding (e.g., convert text into more formal representations such as first-order logic structures that a computer module can manipulate), machine translation (e.g., automatically translate text from one human language to another), morphological segmentation (e.g., separating words into individual morphemes and identify the class of the morphemes, which can be challenging based on the complexity of the morphology or structure of the words of the language being considered), question answering (e.g., determining an answer to a human-language question, which can be specific or open-ended), semantic processing (e.g., processing that can occur after identifying a word and encoding its meaning in order to relate the identified word to other words with similar meanings).

The NLP component 171 converts the audio input signal into recognized text by comparing the input signal against a stored, representative set of audio waveforms (e.g., in the data repository 124) and choosing the closest matches. The set of audio waveforms can be stored in data repository 124 or other database accessible to the data processing system 102. The representative waveforms are generated across a large set of users, and then may be augmented with speech samples from the user. After the audio signal is converted into recognized text, the NLP component 171 matches the text to words that are associated, for example via training across users or through manual specification, with actions that the data processing system 102 can serve.

The audio input signal can be detected by the sensor 134 or transducer 136 (e.g., a microphone) of the client computing device 206. Via the transducer 136, the audio driver 138, or other components the client computing device 206 can provide the audio input signal to the data processing system 102 (e.g., via the network 105) where it can be received (e.g., by the interface 170) and provided to the NLP component 171 or stored in the data repository 124.

The NLP component 171 can obtain the input audio signal. From the input audio signal, the NLP component 171 can identify at least one request or at least one trigger keyword corresponding to the request. The request can indicate intent or subject matter of the input audio signal. The trigger keyword can indicate a type of action likely to be taken. For example, the NLP component 171 can parse the input audio signal to identify at least one request to leave home for the evening to attend dinner and a movie. The trigger keyword can include at least one word, phrase, root or partial word, or derivative indicating an action to be taken. For example, the trigger keyword "go" or "to go to" from the input audio signal can indicate a need for transport. In this example, the input audio signal (or the identified request) does not directly express an intent for transport, however the trigger keyword indicates that transport is an ancillary action to at least one other action that is indicated by the request.

The NLP component 171 can parse the input audio signal to identify, determine, retrieve, or otherwise obtain the request and the trigger keyword. For instance, the NLP component 171 can apply a semantic processing technique to the input audio signal to identify the trigger keyword or the request. The NLP component 171 can apply the semantic processing technique to the input audio signal to identify a trigger phrase that includes one or more trigger keywords, such as a first trigger keyword and a second trigger keyword. For example, the input audio signal can include the sentence "I need someone to do my laundry and my dry cleaning." The NLP component 171 can apply a semantic processing technique, or other natural language processing technique, to the data packets comprising the sentence to identify trigger phrases "do my laundry" and "do my dry cleaning". The NLP component 171 can further identify multiple trigger keywords, such as laundry, and dry cleaning. For example, the NLP component 171 can determine that the trigger phrase includes the trigger keyword and a second trigger keyword.

The NLP component 171 can filter the input audio signal to identify the trigger keyword. For example, the data packets carrying the input audio signal can include "It would be great if I could get someone that could help me go to the airport", in which case the NLP component 171 can filter out one or more terms as follows: "it", "would", "be", "great", "if", "I", "could", "get", "someone", "that", "could", or "help". By filtering out these terms, the NLP component 171 may more accurately and reliably identify the trigger keywords, such as "go to the airport" and determine that this is a request for a taxi or a ride sharing service.

In some cases, the NLP component can determine that the data packets carrying the input audio signal includes one or more requests. For example, the input audio signal can include the sentence "I need someone to do my laundry and my dry cleaning." The NLP component 171 can determine this is a request for a laundry service and a dry cleaning service. The NLP component 171 can determine this is a single request for a service provider that can provide both laundry services and dry cleaning services. The NLP component 171 can determine that this is two requests; a first request for a service provider that performs laundry services, and a second request for a service provider that provides dry cleaning services. In some cases, the NLP component 171 can combine the multiple determined requests into a single request, and transmit the single request to a service provider device 210. In some cases, the NLP component 171 can transmit the individual requests to respective service provider devices 210, or separately transmit both requests to the same service provider device 210.

The data processing system 102 can include a direct action API 116 designed and constructed to generate, based on the trigger keyword, an action data structure responsive to the request. Processors of the data processing system 102 can invoke the direct action API 116 to execute scripts that generate a data structure to a service provider device 210 to request or order a service or product, such as a car from a car share service. The direct action API 116 can obtain data from the data repository 124, as well as data received with end user consent from the client computing device 206 to determine location, time, user accounts, logistical or other information to allow the service provider device 210 to perform an operation, such as reserve a car from the car share service. Using the direct action API 116, the data processing system 102 can also communicate with the service provider device 210 to complete the conversion by in this example making the car share pick up reservation.

The direct action API 116 can execute a specified action to satisfy the end user's intention, as determined by the data processing system 102. Depending on the action specified in its inputs, the direct action API 116 can execute code or a dialog script that identifies the parameters required to fulfill a user request. Such code can look-up additional information, e.g., in the data repository 124, such as the name of a home automation service, or it can provide audio output for rendering at the client computing device 206 to ask the end user questions such as the intended destination of a requested taxi. The direct action API 116 can determine necessary parameters and can package the information into an action data structure, which can then be sent to another component such as the content selector component 118 or to the service provider computing device 210 to be fulfilled.

The direct action API 116 can receive an instruction or command from the NLP component 171, or other component of the data processing system 102, to generate or construct the action data structure. The direct action API 116 can determine a type of action in order to select a template from the template repository 132 stored in the data repository 124. Types of actions can include, for example, services, products, reservations, or tickets. Types of actions can further include types of services or products. For example, types of services can include car share service, food delivery service, laundry service, maid service, repair services, or household services. Types of products can include, for example, clothes, shoes, toys, electronics, computers, books, or jewelry. Types of reservations can include, for example, dinner reservations or hair salon appointments. Types of tickets can include, for example, movie tickets, sports venue tickets, or flight tickets. In some cases, the types of services, products, reservations or tickets can be categorized based on price, location, type of shipping, availability, or other attributes.

The direct action API 116, upon identifying the type of request, can access the corresponding template from the template repository 132. Templates can include fields in a structured data set that can be populated by the direct action API 116 to further the operation that is requested of the service provider device 210 (such as the operation of sending a taxi to pick up an end user at a pickup location and transport the end user to a destination location). The direct action API 116 can perform a lookup in the template repository 132 to select the template that matches one or more characteristic of the trigger keyword and request. For example, if the request corresponds to a request for a car or ride to a destination, the data processing system 102 can select a car sharing service template. The car sharing service template can include one or more of the following fields: device identifier, pick up location, destination location, number of passengers, or type of service. The direct action API 116 can populate the fields with values. To populate the fields with values, the direct action API 116 can ping, poll or otherwise obtain information from one or more sensors 134 of the computing device 206 or a user interface of the device 206. For example, the direct action API 116 can detect the source location using a location sensor, such as a GPS sensor. The direct action API 116 can obtain further information by submitting a survey, prompt, or query to the end of user of the computing device 206. The direct action API can submit the survey, prompt, or query via interface 170 of the data processing system 102 and a user interface of the computing device 206 (e.g., audio interface, voice-based user interface, display, or touch screen). Thus, the direct action API 116 can select a template for the action data structure based on the trigger keyword or the request, populate one or more fields in the template with information detected by one or more sensors 134 or obtained via a user interface, and generate, create or otherwise construct the action data structure to facilitate performance of an operation by the service provider device 210.

The data processing system 102 can select the template based from the template data structure 132 based on various factors including, for example, one or more of the trigger keyword, request, service provider computing device 210, type of service provider computing device 210, a category that the service provider computing device 210 falls in (e.g., taxi service, laundry service, flower service, or food delivery), location, or other sensor information.

To select the template based on the trigger keyword, the data processing system 102 (e.g., via direct action API 116) can perform a look-up or other query operation on the template database 132 using the trigger keyword to identify a template data structure that maps or otherwise corresponds to the trigger keyword. For example, each template in the template database 132 can be associated with one or more trigger keywords to indicate that the template is configured to generate an action data structure responsive to the trigger keyword that the service provider computing device 210 can process to establish a communication session.

In some cases, the data processing system 102 can identify a service provider computing device 210 based on the trigger keyword. To identify the service provider computing device 210 based on the trigger keyword, the data processing system 102 can perform a lookup in the data repository 124 to identify a service provider computing device 210 that maps to the trigger keyword. For example, if the trigger keyword includes "ride" or "to go to", then the data processing system 102 (e.g., via direct action API 116) can identify the service provider computing device 210 as corresponding to Taxi Service Company A. The data processing system 102 can select the template from the template database 132 using the identify service provider computing device 210. For example, the template database 132 can include a mapping or correlation between service provider computing device 210 or entities to templates configured to generate an action data structure responsive to the trigger keyword that the service provider computing device 210 can process to establish a communication session. In some cases, the template can be customized for the service provider computing device 210 or for a category of service provider computing device 210. The data processing system 102 can generate the action data structure based on the template for the service provider computing device 210.

To construct or generate the action data structure, the data processing system 102 can identify one or more fields in the selected template to populate with values. The fields can be populated with numerical values, character strings, Unicode values, Boolean logic, binary values, hexadecimal values, identifiers, location coordinates, geographic areas, timestamps, or other values. The fields or the data structure itself can be encrypted or masked to maintain data security.

Upon determining the fields in the template, the data processing system 102 can identify the values for the fields to populate the fields of the template to create the action data structure. The data processing system 102 can obtain, retrieve, determine or otherwise identify the values for the fields by performing a look-up or other query operation on the data repository 124.

In some cases, the data processing system 102 can determine that the information or values for the fields are absent from the data repository 124. The data processing system 102 can determine that the information or values stored in the data repository 124 are out-of-date, stale, or otherwise not suitable for the purpose of constructing the action data structure responsive to the trigger keyword and request identified by the NLP component 171 (e.g., the location of the client computing device 206 may be the old location and not be the current location; an account can be expired; the destination restaurant may have moved to a new location; physical activity information; or mode of transportation).

If the data processing system 102 determines that it does not currently have access, in memory of the data processing system 102, to the values or information for the field of the template, the data processing system 102 can acquire the values or information. The data processing system 102 can acquire or obtain the information by querying or polling one or more available sensors of the client computing device 206, prompting the end user of the client computing device 206 for the information, or accessing an online web-based resource using an HTTP protocol. For example, the data processing system 102 can determine that it does not have the current location of the client computing device 206, which may be a needed field of the template. The data processing system 102 can query the client computing device 206 for the location information. The data processing system 102 can request the client computing device 206 to provide the location information using one or more location sensors 134, such as a Global Positioning System sensor, WIFI triangulation, cell tower triangulation, Bluetooth beacons, IP address, or other location sensing technique.

The direct action API 116 can transmit the action data structure to a third-party provider device (e.g., service provider device 210) to cause the service provider computing device 210 to invoke a conversational application programming interface (e.g., service provider NLP component 142) and establish a communication session between the service provider computing device 210 and the client computing device 206. Responsive to establishing the communication session between the service provider device 210 and the client computing device 206, the service provider device 210 can transmit data packets directly to the client computing device 206 via network 105. In some cases, the service provider device 210 can transmit data packets to the client computing device 206 via data processing system 102 and network 105.

In some cases, the service provider computing device 210 can execute at least a portion of the conversational API 142. For example, the service provider computing device 210 can handle certain aspects of the communication session or types of queries. The service provider computing device 210 may leverage the NLP component 171 executed by the data processing system 102 to facilitate processing the audio signals associated with the communication session and generating responses to queries. In some cases, the data processing system 102 can include the conversational API 142 configured for the service provider computing device 210. In some cases, the data processing system routes data packets between the client computing device and the third-party provider device to establish the communication session. The data processing system 102 can receive, from the service provider computing device 210, an indication that the third-party provider device established the communication session with the client device 206. The indication can include an identifier of the client computing device 206, timestamp corresponding to when the communication session was established, or other information associated with the communication session, such as the action data structure associated with the communication session.

In some cases, the conversational API can be a second NLP that includes one or more component or function of the first NLP 171. The second NLP 142 can interact or leverage the first NLP 171. In some cases, the system 100 can include a single NLP 171 executed by the data processing system 102. The single NLP 171 can support both the data processing system 102 and the service provider computing device 210. In some cases, the direct action API 116 generates or constructs an action data structure to facilitate performing a service, and the conversational API generates responses or queries to further a communication session with an end user or obtain additional information to improve or enhance the end user's experience or performance of the service.

The data processing system 102 can include, execute, access, or otherwise communicate with a session handler component 114 to establish a communication session between the client device 206 and the data processing system 102. The communication session can refer to one or more data transmissions between the client device 206 and the data processing system 102 that includes the input audio signal that is detected by a sensor 134 of the client device 206, and the output signal transmitted by the data processing system 102 to the client device 206. The data processing system 102 (e.g., via the session handler component 114) can establish the communication session responsive to receiving the input audio signal. The data processing system 102 can set a duration for the communication session. The data processing system 102 can set a timer or a counter for the duration set for the communication session. Responsive to expiration of the timer, the data processing system 102 can terminate the communication session.

The communication session can refer to a network-based communication session in which the client device 206 provides authenticating information or credentials to establish the session. In some cases, the communication session refers to a topic or a context of audio signals carried by data packets during the session. For example, a first communication session can refer to audio signals transmitted between the client device 206 and the data processing system 102 that are related to (e.g., include keywords, action data structures, or content item objects) a taxi service; and a second communication session can refer to audio signals transmitted between the client device 206 and data processing system 102 that are related to a laundry and dry cleaning service. In this example, the data processing system 102 can determine that the context of the audio signals are different (e.g., via the NLP component 171), and separate the two sets of audio signals into different communication sessions. The session handler 114 can terminate the first session related to the ride service responsive to identifying one or more audio signals related to the dry cleaning and laundry service. Thus, the data processing system 102 can initiate or establish the second session for the audio signals related to the dry cleaning and laundry service responsive to detecting the context of the audio signals.

The data processing system 102 can include, execute, or otherwise communicate with a content selector component 118 to receive the trigger keyword identified by the natural language processor and select, based on the trigger keyword, a content item via a real-time content selection process. The content selection process can refer to, or include, selecting sponsored content item objects provided by third-party content providers 106. The real-time content selection process can include a service in which content items provided by multiple content providers are parsed, processed, weighted, or matched in order to select one or more content items to provide to the computing device 206. The content selector component 118 can perform the content selection process in real-time. Performing the content selection process in real-time can refer to performing the content selection process responsive to the request for content received via the client computing device 206. The real-time content selection process can be performed (e.g., initiated or completed) within a time interval of receiving the request (e.g., 5 seconds, 10 seconds, 20 seconds, 30 seconds, 1 minute, 2 minutes, 3 minutes, 5 minutes, 10 minutes, or 20 minutes). The real-time content selection process can be performed during a communication session with the client computing device 206, or within a time interval after the communication session is terminated.

For example, the data processing system 102 can include a content selector component 118 designed, constructed, configured or operational to select content item objects. To select content items for display in a voice-based environment, the data processing system 102 (e.g., via NLP component 171) can parse the input audio signal to identify keywords (e.g., a trigger keyword), and use the keywords to select a matching content item based on a broad match, exact match, or phrase match. For example, the content selector component 118 can analyze, parse, or otherwise process subject matter of candidate content items to determine whether the subject matter of the candidate content items correspond to the subject matter of the keywords or phrases of the input audio signal detected by the microphone of the client computing device 206. The content selector component 118 may identify, analyze, or recognize voice, audio, terms, characters, text, symbols, or images of the candidate content items using an image processing technique, character recognition technique, natural language processing technique, or database lookup. The candidate content items may include metadata indicative of the subject matter of the candidate content items, in which case the content selector component 118 may process the metadata to determine whether the subject matter of the candidate content item corresponds to the input audio signal.

Content providers 106 may provide additional indicators when setting up a content campaign that includes content items. The content provider 106 may provide information at the content campaign or content group level that the content selector component 118 may identify by performing a lookup using information about the candidate content item. For example, the candidate content item may include a unique identifier, which may map to a content group, content campaign, or content provider. The content selector component 118 may determine, based on information stored in content campaign data structure in data repository 124, information about the content provider 106.

The data processing system 102 can receive, via a computer network, a request for content for presentation on a computing device 206. The data processing system 102 can identify the request by processing an input audio signal detected by a microphone of the client computing device 206. The request can include selection criteria of the request, such as the device type, location, and a keyword associated with the request. The request can include the action data structure or action data structure.

Responsive to the request, the data processing system 102 can select a content item object from data repository 124 or a database associated with the content provider 106, and provide the content item for presentation via the computing device 206 via network 105. The content item object can be provided by a content provider computing device 222 different from the service provider device 210. The content item can correspond to a type of service different from a type of service of the action data structure (e.g., taxi service versus food delivery service). The computing device 206 can interact with the content item object. The computing device 206 can receive an audio response to the content item. The computing device 206 can receive an indication to select a hyperlink or other button associated with the content item object that causes or allows the computing device 206 to identify service provider 210, request a service from the service provider 210, instruct the service provider 210 to perform a service, transmit information to the service provider 210, or otherwise query the service provider device 210.

The data processing system 102 can include, execute, or communicate with an audio signal generator component 122 to generate an output signal. The output signal can include one or more portions. For example, the output signal can include a first portion and a second portion. The first portion of the output signal can correspond to the action data structure. The second portion of the output signal can correspond to the content item selected by the content selector component 118 during the real-time content selection process.

The audio signal generator component 122 can generate the output signal with a first portion having sound corresponding to the first data structure. For example, the audio signal generator component 122 can generate the first portion of the output signal based on one or more values populated into the fields of the action data structure by the direct action API 116. In a taxi service example, the values for the fields can include, for example, 123 Main Street for pick-up location, 1234 Main Street for destination location, 2 for number of passengers, and economy for the level of service. The audio signal generator component 122 can generate the first portion of the output signal in order to confirm that the end user of the computing device 206 wants to proceed with transmitting the request to the service provider 210. The first portion can include the following output "Would you like to order an economy car from taxi service provider A to pick two people up at 123 Main Street and drop off at 1234 Main Street?"

In some cases, the first portion can include information received from the service provider device 210. The information received from service provider device 210 can be customized or tailored for the action data structure. For example, the data processing system 102 (e.g., via direct action API 116) can transmit the action data structure to the service provider 210 before instructing the service provider 210 to perform the operation. Instead, the data processing system 102 can instruct the service provider device 210 to perform initial or preliminary processing on the action data structure to generate preliminary information about the operation. In the example of the taxi service, the preliminary processing on the action data structure can include identifying available taxis that meet the level of service requirement that are located around the pick-up location, estimating an amount of time for the nearest available taxi to reach the pick-up location, estimating a time of arrival at the destination, and estimating a price for the taxi service. The estimated preliminary values may include a fixed value, an estimate that is subject to change based on various conditions, or a range of values. The service provider device 210 can return the preliminary information to the data processing system 102 or directly to the client computing device 206 via the network 105. The data processing system 102 can incorporate the preliminary results from the service provider device 210 into the output signal, and transmit the output signal to the computing device 206. The output signal can include, for example, "Taxi Service Company A can pick you up at 123 Main Street in 10 minutes, and drop you off at 1234 Main Street by 9 AM for $10. Do you want to order this ride?" This can form the first portion of the output signal.

In some cases, the data processing system 102 can form a second portion of the output signal. The second portion of the output signal can include a content item selected by the content selector component 118 during a real-time content selection process. The first portion can be different from the second portion. For example, the first portion can include information corresponding to the action data structure that is directly responsive to the data packets carrying the input audio signal detected by the sensor 134 of the client computing device 206, whereas the second potion can include a content item selected by a content selector component 118 that can be tangentially relevant to the action data structure, or include sponsored content provided by a content provider device 106. For example, the end user of the computing device 206 can request a taxi from Taxi Service Company A. The data processing system 102 can generate the first portion of the output signal to include information about the taxi from the Taxi Service Company A. However, the data processing system 102 can generate the second portion of the output signal to include a content item selected based on the keywords "taxi service" and information contained in the action data structure that the end user may be interested in. For example, the second portion can include a content item or information provided by a different taxi service company, such as Taxi Service Company B. While the user may not have specifically requested Taxi Service Company B, the data processing system 102 may nonetheless provide a content item from Taxi Service Company B because the user may choose to perform an operation with Taxi Service Company B.

The data processing system 102 can transmit information from the action data structure to the Taxi Service Company B to determine a pick-up time, time of arrival at the destination, and a price for the ride. The data processing system 102 can receive this information and generate the second portion of the output signal as follows: "Taxi Service Company B can pick you up at 123 Main Street in 2 minutes, and drop you off at 1234 Main Street by 8:52 AM for $15. Do you want this ride instead?" The end user of computing device 206 can then select the ride provided by Taxi Service Company A or the ride provided by Taxi Service Company B.

Prior to providing, in the second portion of the output signal, the sponsored content item corresponding to the service provided by Taxi Service Company B, the data processing system 102 can notify the end user computing device that the second portion corresponds to a content item object selected during a real-time content selection process (e.g., by the content selector component 118). However, the data processing system 102 can have limited access to different types of interfaces to provide the notification to the end user of the computing device 206. For example, the computing device 206 may not include a display device, or the display device may be disabled or turned off. The display device of the computing device 206 may consume greater resources than the speaker of the computing device 206, so it may be less efficient to turn on the display device of the computing device 206 as compared to using the speaker of the computing device 206 to convey the notification. Thus, in some cases, the data processing system 102 can improve the efficiency and effectiveness of information transmission over one or more interfaces or one or more types of computer networks. For example, the data processing system 102 (e.g., via the audio signal generator component 122) can module the portion of the output audio signal comprising the content item to provide the indication or notification the end user that that portion of the output signal comprises the sponsored content item.

The data processing system 102 (e.g., via interface 170 and network 105) can transmit data packets comprising the output signal generated by the audio signal generator component 122. The output signal can cause the audio driver component 138 of or executed by the client device 206 to drive a speaker (e.g., transducer 136) of the client device 206 to generate an acoustic wave corresponding to the output signal.

Figure 2:
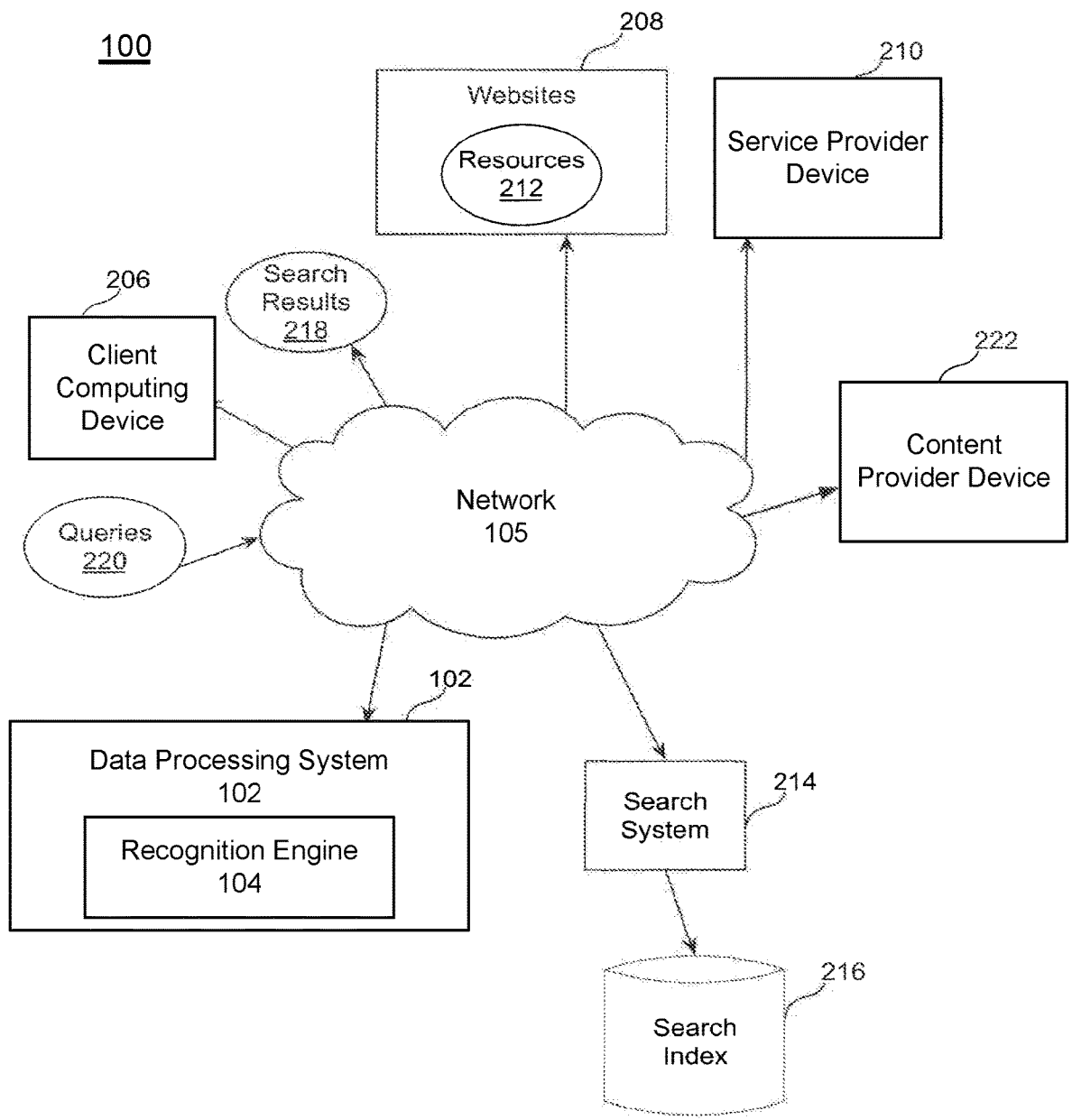
FIG. 2 is a block diagram of an example environment in which a digital component system manages digital component distribution services.

FIG. 2 is a block diagram of an example system 100 in which a data processing system 102 manages digital component distribution services. The example system 100 includes one or more networks 105, such as a local area network (LAN), a wide area network (WAN), the Internet, or a combination thereof. The network 105 connects user devices 206, websites 208, service provider computing devices 210, and the data processing system 102. The system 100 may include many thousands of user devices 206, websites 208, and service provider computing devices 210.

A website 208 is one or more resources 212 associated with a domain name and hosted by one or more servers. An example website is a collection of webpages formatted in hypertext markup language (HTML) that can contain text, images, multimedia content, and programming elements, such as scripts. Each website 208 is maintained by a content provider computing device 222, which is an entity that controls, manages and/or owns the website 208.

A resource 212 is any data that can be provided over the network 105. A resource 212 is identified by a resource address that is associated with the resource 212. Resources include HTML pages, word processing documents, and portable document format (PDF) documents, images, video, and feed sources, to name only a few. The resources can include content, such as words, phrases, images and sounds, that may include embedded information (such as meta-information in hyperlinks) and/or embedded instructions (such as JavaScript scripts).

A user device 206 is an electronic device that is under control of a user and is capable of requesting and receiving resources over the network 105. Example user devices 206 include personal computers, mobile communication devices, and other devices that can send and receive data over the network 105. A user device 206 typically includes a user application, such as a web browser, to facilitate the sending and receiving of data over the network 105. User devices 206, such as mobile communication devices, may also include other user applications, such as text message applications, gaming applications, news applications, book and magazine reader applications, and other applications provided by content provider computing devices 222. Applications provided by content provider computing devices 222 may also be known as resources.

A user device 206 can request resources 212 from a website 208. In turn, data representing the resource 212 can be provided to the user device 206 for presentation by the user device 206. The data representing the resource 212 can also include data specifying a portion of the resource or a portion of a user display (e.g., a presentation location of a pop-up window or in a slot of a webpage) in which digital components can be presented. These specified portions of the resource or user display are referred to as digital component slots.

To facilitate searching of these resources, the environment can include a search system 214 that identifies the resources by crawling and indexing the resources provided by the content provider computing devices on the websites 208. Data about the resources can be indexed based on the resource to which the data corresponds. The indexed and, optionally, cached copies of the resources are stored in an indexed cache 216.

User devices 206 can submit search queries 220 to the search system 214 over the network 105. In response, the search system 214 accesses the indexed cache 216 to identify resources that are relevant to the search query 220. The search system 214 identifies the resources in the form of search results 218 and returns the search results 218 to the user devices 206 in search results pages. A search result 218 is data generated by the search system 214 that identifies a resource that is responsive to a particular search query, and includes a link to the resource. An example search result 218 can include webpage title, a snippet of text or a portion of an image extracted from the webpage, and the URL of the webpage. Search results pages can also include one or more digital component slots in which digital components can be presented.

When a resource 212 provided by a content provider computing device 222 or search results 218 are requested by a user device 206, the data processing system 102 receives a request for digital components to be provided with the resource 212, from a content provider computing device 222, or search results 218. The request for digital components can include characteristics of the digital component slots that are defined for the requested resource or search results page, and can be provided to the data processing system 102.

For example, a reference (e.g., URL) to the resource for which the digital component slot is defined, a size of the digital component slot, and/or media types that are available for presentation in the digital component slot can be provided to the data processing system 102. Similarly, keywords associated with a requested resource ("resource keywords") or a search query 220 for which search results are requested can also be provided to the data processing system 102 to facilitate identification of digital components that are relevant to the resource or search query 220. Further, images and multimedia elements that are associated with the resource may be provided to the data processing system 102.

Based on data included in the request for digital components, the data processing system 102 can select digital components that are eligible to be provided in response to the request ("eligible digital components"). For example, eligible digital components can include digital components having characteristics matching the characteristics of digital component slots and that are identified as relevant to specified resource keywords or search queries 220. In some implementations, digital components having targeting keywords that match the resource keywords or the search query 220 are selected as eligible digital components by the data processing system 102. As described with respect to embodiments, digital components associated with digital component images with features matching images associated with a resource or webpage may be selected as eligible digital components by the data processing system 102.

A targeting keyword can match a resource keyword or a search query 220 by having the same textual content ("text") as the resource keyword or search query 220. For example, a digital component associated with the targeting keyword "daisy" can be an eligible digital component for a digital component request including the resource keyword "daisy." Similarly, the digital component can be selected as an eligible digital component for a digital component request including the search query "daisy."

A targeting keyword can also match a resource keyword or a search query 220 by having text that is identified as being relevant to a targeting keyword or search query 220 despite having different text than the targeting keyword. For example, a digital component having the targeting keyword "daisy" may also be selected as an eligible digital component for a digital component request including a resource keyword or search query for "flowers" because daisy is a type of flower, and therefore, is likely to be relevant to the term "flowers."

As described herein with reference to embodiments, the digital component system can use features of multimedia elements provided in the request for digital components from the content provider computing device to identify relevant digital components. The digital component system may also use text labels associated with multimedia elements provided in the request for digital components to identify relevant digital components.

Search system 214 may provide functionality to users including image search functionality, audio search functionality, and video search functionality. A user may search for images by entering a search query 220 including one or more keywords. For example, the user may enter the search query "handbag" and be presented with a selection of one or more images of handbags or purses. Upon selecting an image, the image may then be associated with the search query term "handbag" as the text label for that image. The image may be provided as part of a content provider computing device webpage. Accordingly, the digital component system may use this text label to identify relevant digital components in response to a request for digital components.

Similarly, a user may search for audio content or video content by entering a search query 220 including one or more keywords. For example, the user may enter the search query "sports car" and be presented with a selection of one or more videos of sports cars or race cars. Upon selecting a video, the video may then be associated with the search query term "sports car" as the text label for that video. The video may be provided as part of a content provider computing device webpage. Accordingly, the digital component system may use this text label to identify relevant digital components in response to a request for digital components.

The data processing system 102 can select the eligible digital components that are provided for presentation in digital component slots of a resource based on results of an auction. For example, the data processing system 102 can receive bids from service provider computing devices and allocate the digital component slots to the highest bidders at the conclusion of the auction. The bids are amounts that the service provider computing devices are willing to pay for presentation (or selection) of their digital component with a resource or search results page. For example, a bid can specify an amount that a service provider computing device is willing to pay for each 1000 impressions (i.e., presentations) of the digital component, referred to as a CPM bid. Alternatively, the bid can specify an amount that the service provider computing device is willing to pay for a selection (i.e., a click-through) of the digital component or a "conversion" following selection of the digital component. The highest bidders can be determined based on the bids alone, or based on the bids of each bidder being multiplied by one or more factors, such as quality scores derived from digital component performance, landing page scores, and the like.

Service Provider Computing Devices can also specify budgets for their digital component campaigns. A budget is a specified amount that a service provider computing device is willing to pay for distribution of content over a specified budget period. The specified period can be, for example, a specified time (e.g., one day, one week, or one year), a specified number of events (e.g., a number of impressions or clicks), or some other delineation of time or events. Once the amount the service provider computing device is charged for distribution of content during the budget period matches or exceeds the budget amount, the campaign can be prevented from providing content for the remainder of the budget period unless the service provider computing device increases or overrides its specified budget.

A conversion occurs when a user performs a particular action related to a digital component provided with a resource or search results page. What constitutes a conversion may vary from case to case and can be determined in a variety of ways. For example, a conversion may occur when a user clicks on a digital component, is referred to a webpage, and consummates a purchase there before leaving that webpage. A conversion can also be defined by a service provider computing device to be any measurable/observable user action such as, for example, downloading a white paper, navigating to at least a given depth of a website, viewing at least a certain number of webpages, spending at least a predetermined amount of time on a website or webpage, or registering on a website. Other actions that constitute a conversion can also be used.

In one embodiment, digital components may be computer display digital components. a service provider computing device 210 may provide data associated with one or more digital components, such as a service provider computing device name, text to be included in a digital component, keywords, and other information. The data processing system 102 may generate computer display digital components based on the received data. For example, the data processing system 102 may combine the received data into a creative for the digital component, and generate a computer display digital component responsive to the keywords specified by the service provider computing device. In another embodiment, computer display digital components may be provided by service provider computing devices 210.

In embodiments, data processing system 102 (and its recognition engine 104) may be implemented in software, firmware, hardware or any combination thereof on one or more computing devices. For example, data processing system 102 may be part of or may be implemented with a computing device, such as, a processor-based computing device. A computing device can be any type of device having one or more processors. For example, a computing device can be a workstation, mobile device (e.g., a mobile phone, personal digital assistant, tablet or laptop), computer, server, compute cluster, server farm, game console, set-top box, kiosk, embedded system or other device having at least one processor and memory. Embodiments may be software executed by a processor, firmware, hardware or any combination thereof in a computing device.

Examples of providing image digital components based on the content of a resource are described with reference to FIGS. 3-5. A system that can be used to implement these examples is then described with reference to FIG. 6.

Figure 3:
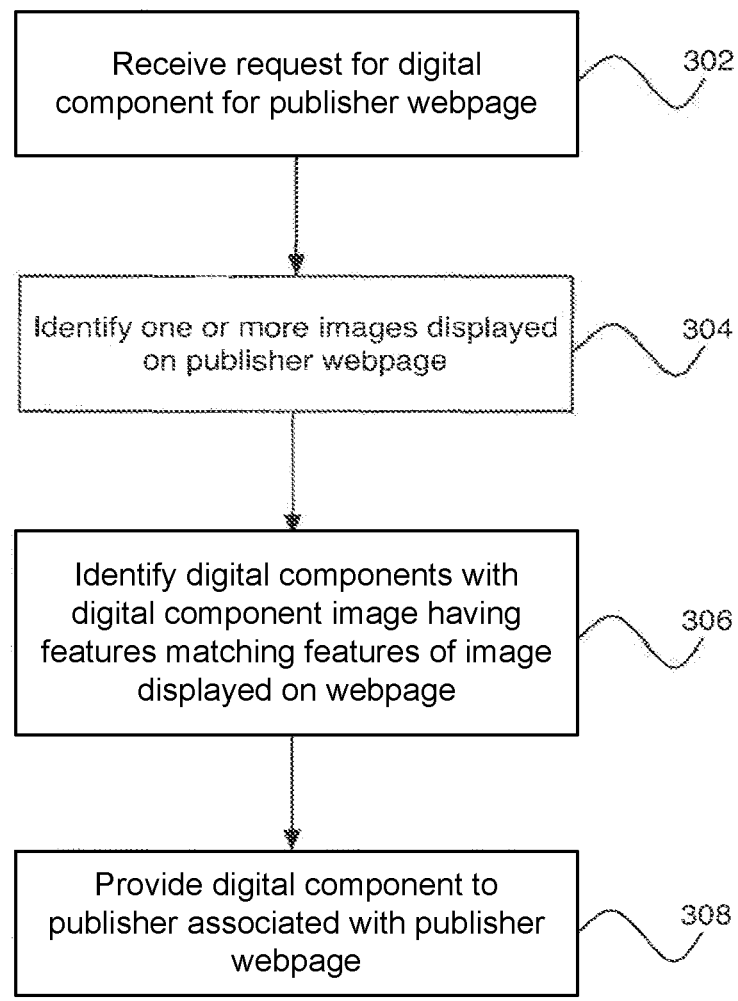
FIG. 3 is a flow diagram illustrating a method for providing digital components based on content of a resource.
Figure 4:
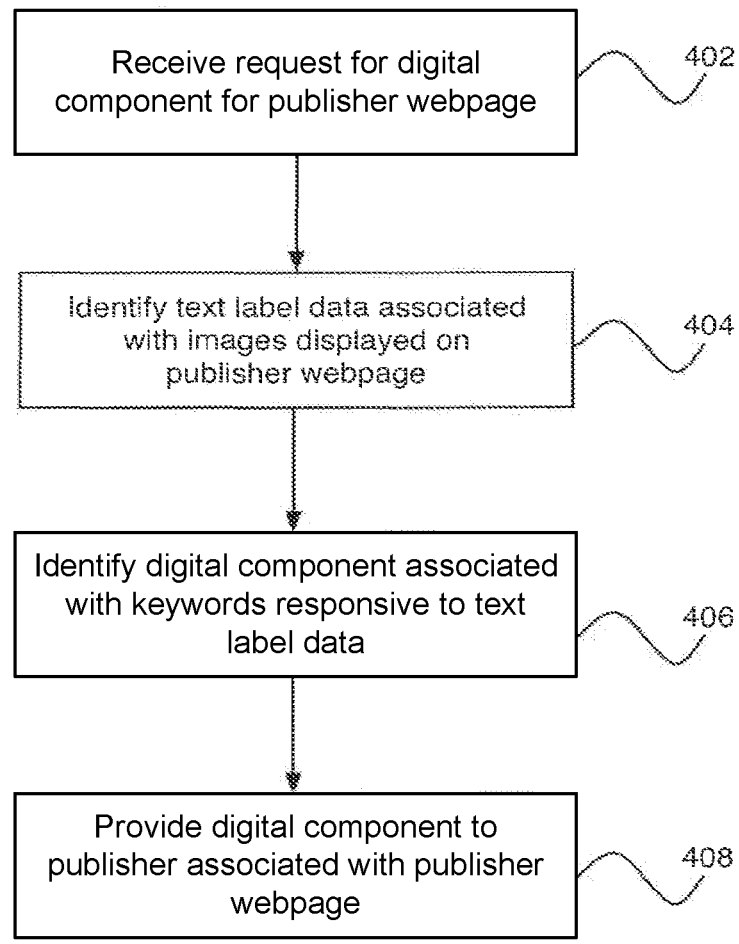
FIG. 4 is a flow diagram illustrating a further method for providing digital components based on content of a resource.

FIG. 3 illustrates an exemplary method 300 for providing computer display digital components based on multimedia element content of a resource, according to an embodiment. The process 300 can be implemented, for example, by the recognition engine 104 and/or the data processing system 102 of FIG. 2. In some implementations, the recognition engine 104 is a data processing apparatus that includes one or more processors that are configured to perform actions of the process 300. In other implementations, a computer readable medium can include instructions that when executed by a computer cause the computer to perform actions of the process 300.

In step 302, a request for digital components for a content provider computing device resource is received. The request for digital components may be received in response to a user requesting a content provider computing device webpage from the content provider computing device, or requesting a resource from a content provider computing device such as an application. The request for digital components may include one or more multimedia elements displayed on the content provider computing device resource, as well as keywords associated with the content of the content provider computing device resource.

In step 304, one or more multimedia elements displayed on the resource are identified. Further, features of each of the one or more multimedia elements may be extracted. Multimedia elements may include, but are not limited to, images, audio data, video data, animation data, interactive elements of the resource, or other data that may be included on a content provider computing device resource. Feature extraction is further described below.

In step 306, a digital component associated with a digital component multimedia element is identified. As described with reference to step 304, digital component multimedia elements may include, but are not limited to, image, audio data, video data, animation data, interactive elements, or other data. The digital component can be identified by matching features of the digital component multimedia element with features of the one on more multimedia elements displayed on the resource. For example, if the multimedia element is an image, one or more edges, corner features, line features, interest points, blobs, regions of interest, or ridges in an image displayed on the content provider computing device resource may match one or more of such features in a digital component image. Based on this matching, the digital component associated with the digital component image may be identified.

In one embodiment, features may be extracted from the images displayed on the content provider computing device's resource using a feature detection technique. Features may include, but are not limited to, edges, corner features, interest points, blobs or regions of interest, or ridges. Feature detection techniques may include, but are not limited to, canny edge detection, scale-invariant feature transform (SIFT), speeded up robust feature (SURF), and other known feature detection techniques. Further, in one embodiment, features may be extracted from digital component images when a digital component with an associated digital component image is provided by a service provider computing device, such that the features can be matched in response to a request for digital components.

In one embodiment, a digital component may be identified if the number of features that match between an image on a content provider computing device resource and a digital component image meets a threshold. For example, a digital component may be identified only if five or more features match between a digital component image associated with the digital component and an image on the content provider computing device resource. Defining such a threshold may, increase the likelihood that the identified digital component corresponds to the image content of the content provider computing device resource.

In one embodiment, features of the multimedia elements displayed on the content provider computing device's resource may include text label data. As described above, when a user performs a query for images, video, audio, or other content, the query terms that result in the multimedia element may be associated with the multimedia element after the user selects or clicks on the multimedia element. The query terms may become text label data associated with the multimedia element.

In one embodiment, features of audio data included on a content provider computing device resource may be matched with features of audio data associated with a digital component. For example, features of the audio data included on the content provider computing device resource may be matched with features of audio data associated with a digital component by using audio search technique. Such a technique may extract a feature, such as a unique fingerprint of the audio data included on the content provider computing device resource, and compare the unique fingerprint to a fingerprint of audio data associated with a digital component. If the unique fingerprint matches the fingerprint of audio data associated with a digital component in part or in whole; the digital component associated with the audio data may be identified.

In one embodiment, features of video data included on a content provider computing device resource may be matched with features of video data associated with a digital component. For example, features of video data included on the content provider computing device resource may be extracted and matched with features of video data associated with a digital component, using a video matching technique. Such a technique may extract individual still frames of each video and compare the still frames to determine whether a video on a content provider computing device resource matches a video associated with a digital component. If a threshold number of frames matches between the videos, the digital component associated with the video may be identified. Similarly, image matching techniques as described herein may match individual flames of video data associated with a digital component to images displayed on a content provider computing device resource. If edges, corner features, or other features of the individual frames of video data are associated with a digital component that match features in the image displayed on the content provider computing device resource, the digital component may be identified.

In one embodiment, the format of the digital component multimedia element is the same as the format of the multimedia element displayed on the content provider computing device resource. For example, a digital component associated with a video as its digital component multimedia element may be identified in response to a request for digital components from a content provider computing device resource displaying a video. In another embodiment, the format of the digital component multimedia element is different than the format of the multimedia element displayed on the content provider computing device resource. Thus, for example, a digital component associated with an image of shoes as its digital component multimedia element may be identified in response to a request for digital components from a content provider computing device resource displaying a video of sports players wearing the same or similar shoes. Such a digital component may be identified using image matching techniques as described above.

In step 308, the digital component is provided to the content provider computing device associated with the content provider computing device resource. The digital component may be provided over a computer network to the content provider computing device. The digital component may then be displayed on the content provider computing device resource along with the content of the content provider computing device resource, FIG. 4 illustrates a further exemplary method 400 for providing computer display digital components based on multimedia content of a resource, according to an embodiment.

In step 402, a request for digital components for a content provider computing device resource is received. The request for digital components may be received in response to a user requesting a content provider computing device resource from the content provider computing device, or requesting a resource from a content provider computing device such as an application, and may include one or more multimedia elements displayed on the content provider computing device resource or other content of the content provider computing device resource.

In step 404, text label data associated with each of the one or more multimedia elements is identified. As described above, query terms associated with a multimedia element may be used as text label data for the multimedia element. Text label data may further be a label associated with the multimedia element which describes the multimedia element. For example, metadata or data associated with the image may be used as text label data. For example, the "alt" or "title" attribute of an HTML image tag may allow a content provider computing device to specify text that is displayed instead of an image or along with an image. Text included in the "alt" attribute may be used to find relevant digital components.

In step 406, a digital component associated with a keyword responsive to the text label data is identified. The digital component can be identified by matching text label data of the multimedia element displayed on the content provider computing device resource to keywords of a digital component. For example, the digital component may be associated with a keyword that exactly matches the text label data. Additionally, the digital component may be associated with a keyword related to the text label data.

In step 408, the digital component is provided to a content provider computing device associated with the content provider computing device resource. The digital component may then be displayed on the content provider computing device resource along with the content of the content provider computing device resource.

In one embodiment, the content provider computing device associated with the content provider computing device resource is compensated for displaying the digital component. For example, the content provider computing device associated with the content provider computing device resource may be compensated an amount corresponding to the bid amount of the provided digital component.

According to an embodiment, steps 302, 304, 306, and 308 may be performed by the recognition engine 104. Further, steps 402, 404, 406 and 408 may be performed by the recognition engine 104.

Figure 5:
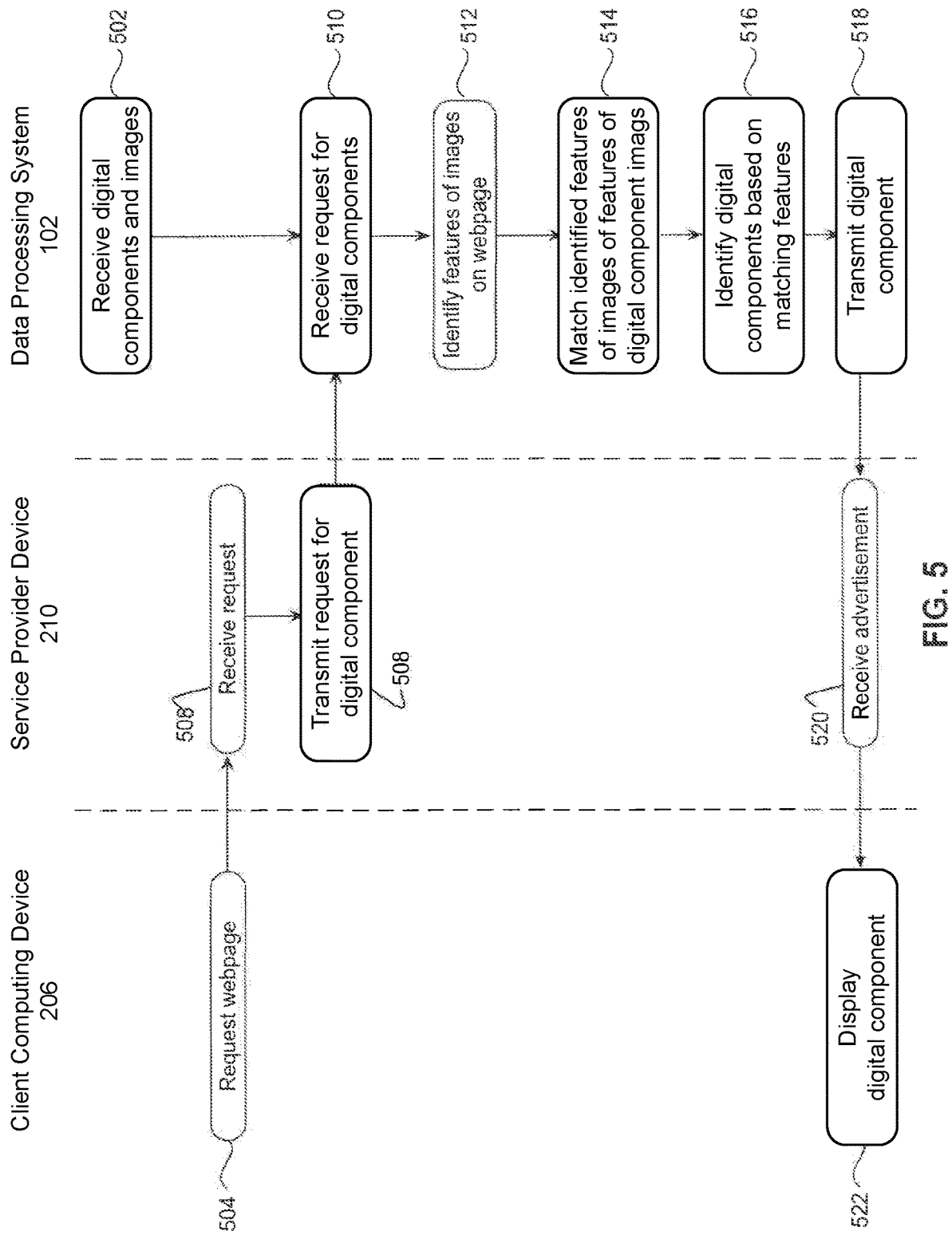
FIG. 5 is a swim lane diagram illustrating a process for providing digital components based on content of a resource, according to an embodiment.

FIG. 5 is a swim lane diagram illustrating a process for providing computer display digital components responsive to image content. In box 502, a data processing system 102 receives computer display digital components and bids. Each computer display digital component may be associated with a digital component multimedia element.

In box 504, a user device requests a resource, such as a webpage. A content provider computing device 222 may receive the request in box 506 and in response may transmit a request for digital components to data processing system 102 in box 508. The request may include multimedia elements displayed on the content provider computing device webpage. In box 510, the data processing system 102 receives the request for digital components, and in box 512, the data processing system 102 identifies features of multimedia elements displayed on the content provider computing device webpage, as described herein.

In box 514, the digital component may match identified features to features of digital component multimedia elements received in box 502. Based on matching features, in box 516, a computer display digital component may be identified by data processing system 102. The data processing system 102 may then transmit the computer display digital component to content provider computing device 222 in box 518.

In box 520, the content provider computing device may receive the computer display digital component, which may then be displayed on the requested webpage in box 522 for presentation to the user device.

Figure 6:
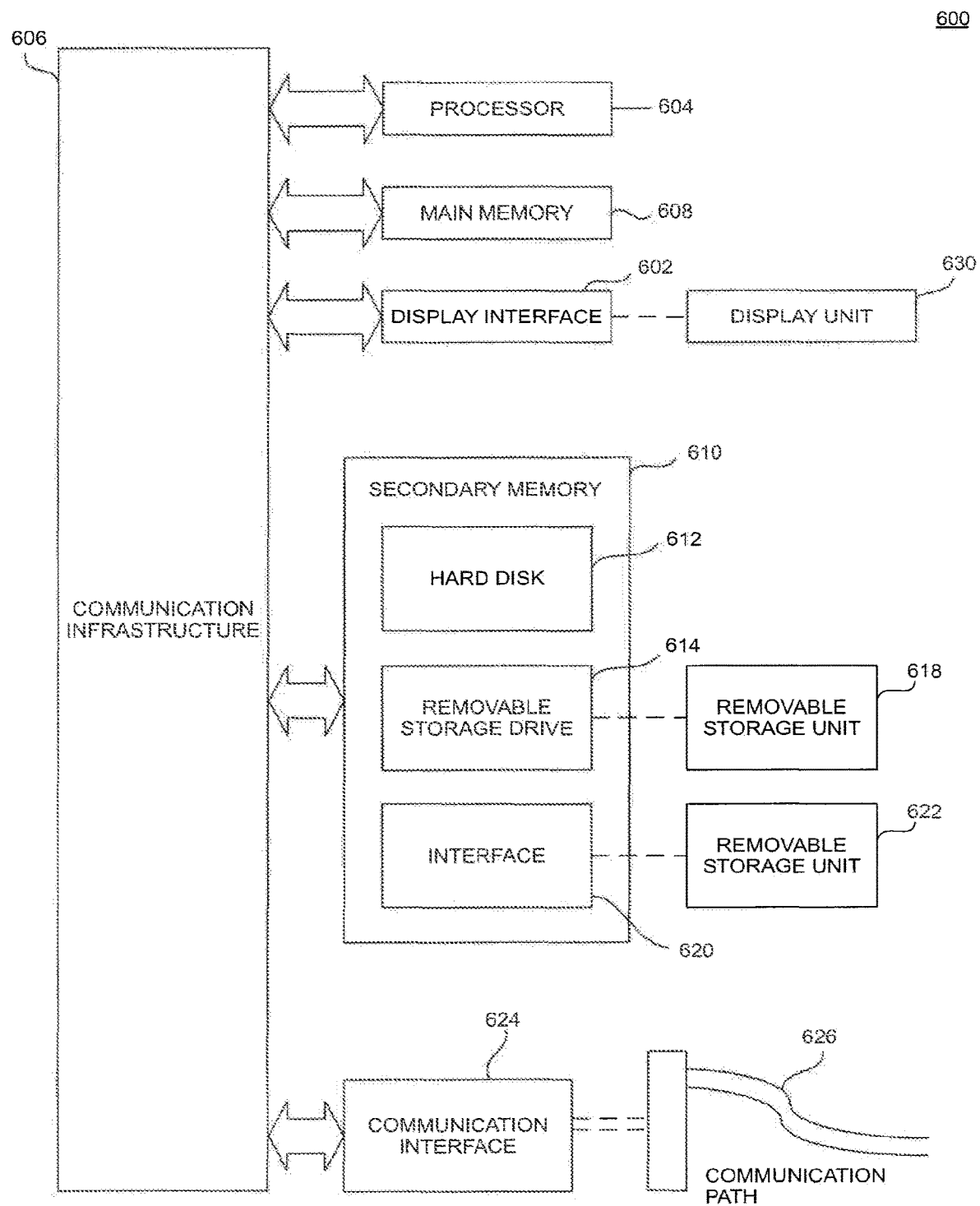
FIG. 6 is a system diagram that can be used to implement embodiments described herein.

FIG. 6 illustrates an example computer system 600 in which embodiments, or portions thereof; may be implemented as computer-readable code. For example, data processing system 102 may be implemented in computer system 600 using hardware, software, firmware, tangible computer-readable media having instructions stored thereon, or a combination thereof and may be implemented in one or more computer systems or other processing systems. Hardware, software, or any combination of such may embody any of the modules and components in the systems described herein.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, a computing device having at least one processor device and a memory may be used to implement the above-described embodiments. A processor device may be a single processor, a plurality of processors, or combinations thereof. Processor devices may have one or more processor "cores."

Various embodiments of the invention are described in terms of this example computer system 600. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or -remotely for access by single or multiprocessor machines. In addition, in some embodiments the order of operations may be rearranged without departing from the spirit of the disclosed subject matter.

Processor device 604 may be a special purpose or a general-purpose processor device. As will be appreciated by persons skilled in the relevant art, processor device 604 may also be a single processor in a multi-core/multiprocessor system, such system operating alone, or in a cluster of computing devices operating in a cluster or server farm. Processor device 604 is connected to a communication infrastructure 606, for example, a bus, message queue, network, or multi-core message-passing scheme.

Computer system 600 also includes a main memory 608, for example, random access memory (RAM), and may also include a secondary memory 610. Secondary memory 610 may include, for example, a hard disk drive 612, or a removable storage drive 614. Removable storage drive 614 may comprise a floppy disk drive, a magnetic tape drive, an optical disk drive, a flash memory, or the like. The removable storage drive 614 reads from and/or writes to a removable storage unit 618 in a well-known manner. Removable storage unit 618 may comprise a floppy disk, magnetic tape, optical disk, etc. which is read by and written to by removable storage drive 618. As will be appreciated by persons skilled in the relevant art, removable storage unit 618 includes a computer-readable storage medium having stored therein computer software and/or data.

In alternative implementations, secondary memory 610 may include other similar means for allowing computer programs or other instructions to be loaded into computer system 600. Such means may include, for example, a removable storage unit 622 and an interface 620. Examples of such means may include a program cartridge and cartridge interface such as that found in video game devices), a removable memory chip (such as an EPROM, or PROM) and associated socket, and other removable storage units 622 and interfaces 620 which allow software and data to be transferred from the removable storage unit 622 to computer system 600.

Computer system 600 may also include a communications interface 624. Communications interface 624 allows software and data to be transferred between computer system 600 and external devices. Communications interface 624 may include a modem, a network interface (such as an Ethernet card), a communications port, a PCMCIA slot and card, or the like. Software and data transferred via communications interface 624 may be in the form of signals, which may be electronic, electromagnetic, optical, or other signals capable of being received by communications interface 624. These signals may be provided to communications interface 624 via a communications path 626. Communications path 626 carries signals and may be implemented using wire or cable, fiber optics, a phone line, a cellular phone link, an RFC link or other communications channels.

In this document, the terms "computer program medium" and "computer-readable medium" are used to generally refer to media such as removable storage unit 618, removable storage unit 622, and a hard disk installed in hard disk drive 612. Computer program medium and computer-readable medium may also refer to memories, such as main memory 608 and secondary memory 610, which may be memory semiconductors (e.g. DRAMs, etc.).

Computer programs (also called computer control logic) are stored in main memory 608 and/or secondary memory 610. Computer programs may also be received via communications interface 624. Such computer programs, when executed, enable computer system 600 to implement the present invention as discussed herein. In particular, the computer programs, when executed, enable processor device 604 to implement the processes of the present invention, such as the stages in the method illustrated by flowchart 300 of FIG. 3 or flowchart 400 of FIG. 4 discussed above. Accordingly, such computer programs represent controllers of the computer system 600. Where the invention is implemented using software, the software may be stored in a computer program product and loaded into computer system 600 using removable storage drive 614, interface 620, and hard disk drive 612, or communications interface 624.

Embodiments also may be directed to computer program products comprising software stored on any computer-readable medium. Such software, when executed in one or more data processing device, causes a data processing device(s) to operate as described herein. Embodiments employ any computer useable or readable medium. Examples of tangible computer-readable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

Figure 7:
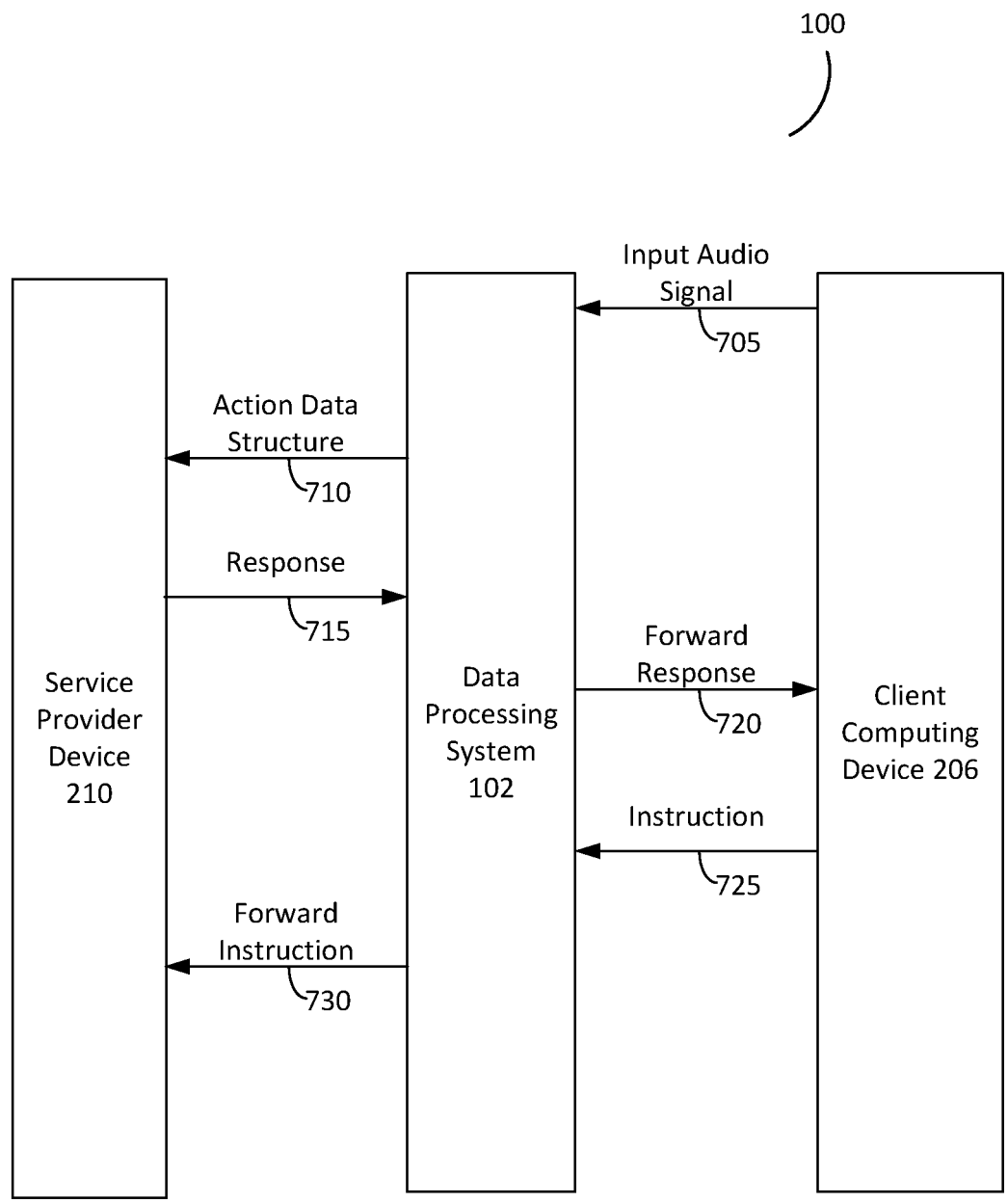
FIG. 7 is an illustration of an operation of a system to route packetized actions via a computer network.

FIG. 7 is an illustration of the system 100 to route packetized actions via a computer network. The system can include one or more component of system 100 depicted in FIG. 1C. At ACT 705, the client computing device 206 can transmit data packets carrying the input audio signal detected by a microphone or other sensor of the computing device 206. The client computing device 206 can transmit the input audio signal to the data processing system 102. The data processing system 102 can parse the input audio signal to identify a keyword, request or other information to generate an action data structure responsive to the request.

At ACT 710, the data processing system 102 can transmit the action data structure to the service provider device 210 (or service provider computing device 210). The data processing system 102 can transmit the action data structure via a network. The service provider device 210 can include an interface configured to receive and process the action data structure transmitted by the data processing system 102.

The service provider device 210 (e.g., via a conversational API) can respond to the action data structure at ACT 715. The response from the service provider device 210 can include an indication of a service to perform corresponding to the action data structure. The response can include a confirmation to proceed with performing the operation. The response can include a request for further information to perform the operation corresponding to the action data structure. For example, the action data structure can be for a ride, and the service provider 210 can respond with a request for further information such as a number of passengers for the ride, a type of car desired by the passenger, desired amenities in the car, or preferred pick up location. The request for additional information can include information that may not be present in the action data structure. For example, the action data structure can include baseline information to perform the operation, such as the pick-up location, destination location, and number of passengers. The baseline information can be the standard data set used by a plurality of service provider computing devices 210 within the taxi service category. However, a certain taxi service provider 210 can choose to customize and improve the operation by requesting additional information or preferences from the client computing device 206.

The service provider device 210 can transmit one or more data packets carrying the response to the data processing system 102 at ACT 715. The data processing system 102 can parse the data packets and identify a source of the data packets and a destination for the data packets. At ACT 720, the data processing system 102 can, accordingly, route or forward the data packets to the client computing device 206. The data processing system 102 can route or forward the data packets via network 105.

At ACT 725, the client computing device 206 can transmit an instruction or command to the data processing system 102 based on the forwarded response. For example, the response forwarded at 725 can be a request for a number of passengers and a confirmation to proceed with scheduling the taxi ride. The instruction at 725 can include the number of passengers and the instruction to proceed with scheduling the pickup. The client device 206 can transmit one or more data packets carrying the instruction to the data processing system 102. The data processing system 102 can route or forward the data packets carrying the instructions to the service provider device 210 at ACT 730.

In some cases, the data processing system 102 can route or forward the data packets at ACT 720 or ACT 730 as-is (e.g., without manipulating the data packets). In some cases, the data processing system 102 can process the data packets to filter out information, or encapsulate the data packets with information to facilitate processing of the data packets by the service provider device 210 or the client computing device 206. For example, the data processing system 102 can mask, hide, or protect the identity of the client computing device 206 from the service provider device 210. Thus, the data processing system 102 can encrypt identifying information using a hash function such that the service provider 210 cannot directly identify a device identifier or username of the client computing device 206. The data processing system 102 can maintain a mapping of the proxy identifier provided to the service provider device 210 for use during the communication session to the identifier or username of the client computing device 206.

Figure 8:
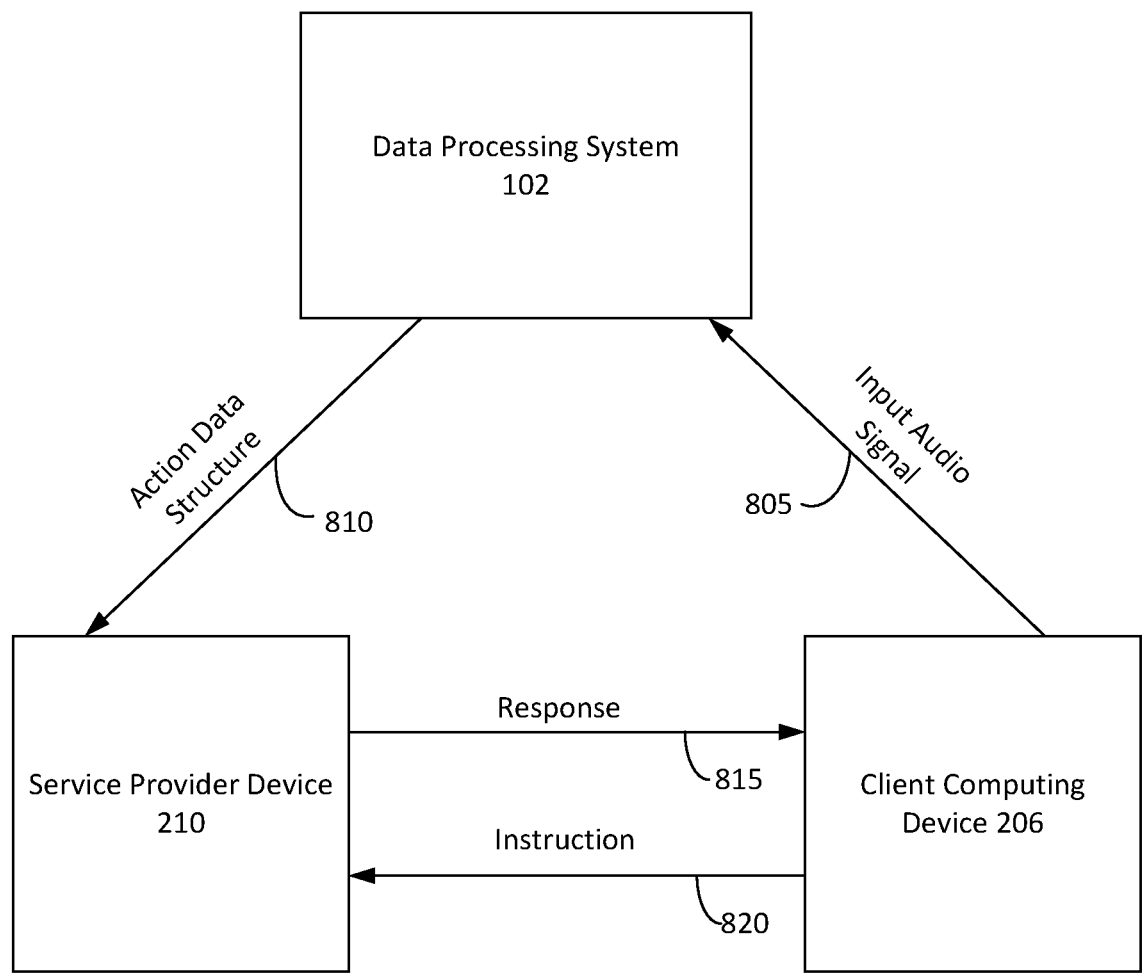
FIG. 8 is an illustration of an operation of a system to route packetized actions via a computer network.

FIG. 8 is an illustration of the system 100 to route packetized actions via a computer network. The system can include one or more component of system 100 depicted in FIG. 1C. At 805, the client computing device 206 can transmit data packets carrying the input audio signal detected by a microphone or other sensor of the computing device 206. The client computing device 206 can transmit the input audio signal to the data processing system 102. The data processing system 102 can parse the input audio signal to identify a keyword, request or other information to generate an action data structure responsive to the request.

At ACT 810, the data processing system 102 can transmit the action data structure to the service provider device 210 (or service provider computing device 210). The data processing system 102 can transmit the action data structure via a network. The service provider device 210 can include an interface configured to receive and process the action data structure transmitted by the data processing system 102.

The service provider device 210 (e.g., via a conversational API) can respond to the action data structure at ACT 815. The response from the service provider device 210 can include an indication of a service to perform corresponding to the action data structure. The response can include a confirmation to proceed with performing the operation. The response can include a request for further information to perform the operation corresponding to the action data structure. For example, the action data structure can be for a ride, and the service provider 210 can respond with a request for further information such as a number of passengers for the ride, a type of car desired by the passenger, desired amenities in the car, or preferred pick up location. The request for additional information can include information that may not be present in the action data structure. For example, the action data structure can include baseline information to perform the operation, such as the pick-up location, destination location, and number of passengers. The baseline information can be the standard data set used by a plurality of service provider computing devices 210 within the taxi service category. However, a certain taxi service provider 210 can choose to customize and improve the operation by requesting additional information or preferences from the client computing device 206.

The service provider device 210 can transmit one or more data packets carrying the response directly to the client computing device 206 via a network 105. For example, instead of routing the response through the data processing system 102, the service provider device 210, via a conversational API executed by the service provider device 210, can respond directly to the client computing device 206. This can allow the service provider to customize the communication session.

At ACT 820, the client computing device 206 can transmit an instruction or command to service provider device 210 based on the response. For example, the response provided at 815 can be a request for a number of passengers and a confirmation to proceed with scheduling the taxi ride. The instruction at 820 can include the number of passengers and the instruction to proceed with scheduling the pickup. The client device 206 can transmit one or more data packets carrying the instruction to the service provider device 210 instead of routing the data packets through the data processing system 102.

The data processing system 102 can facilitate the service provider device 210 and the client computing device 206 establishing a communication session independent of the data processing system 102 by passing communication identifiers to the respective devices. For example, the data processing system 102 can forward an identifier of the device 206 to the service provider computing device 210; and the data processing system 102 can forward an identifier of the service provider computing device 210 to the device 206. Thus, the service provider computing device 210 can establish the communication session directly with the device 206.

In some cases, the service provider computing device 210 or device 206 can separately forward information, such as status information, about the communication session to the data processing system 102. For example, the service provider computing device 210 can provide, to the data processing system, an indication that the service provider computing device 210 successfully established the communication session with the client device 206.

Figure 9:
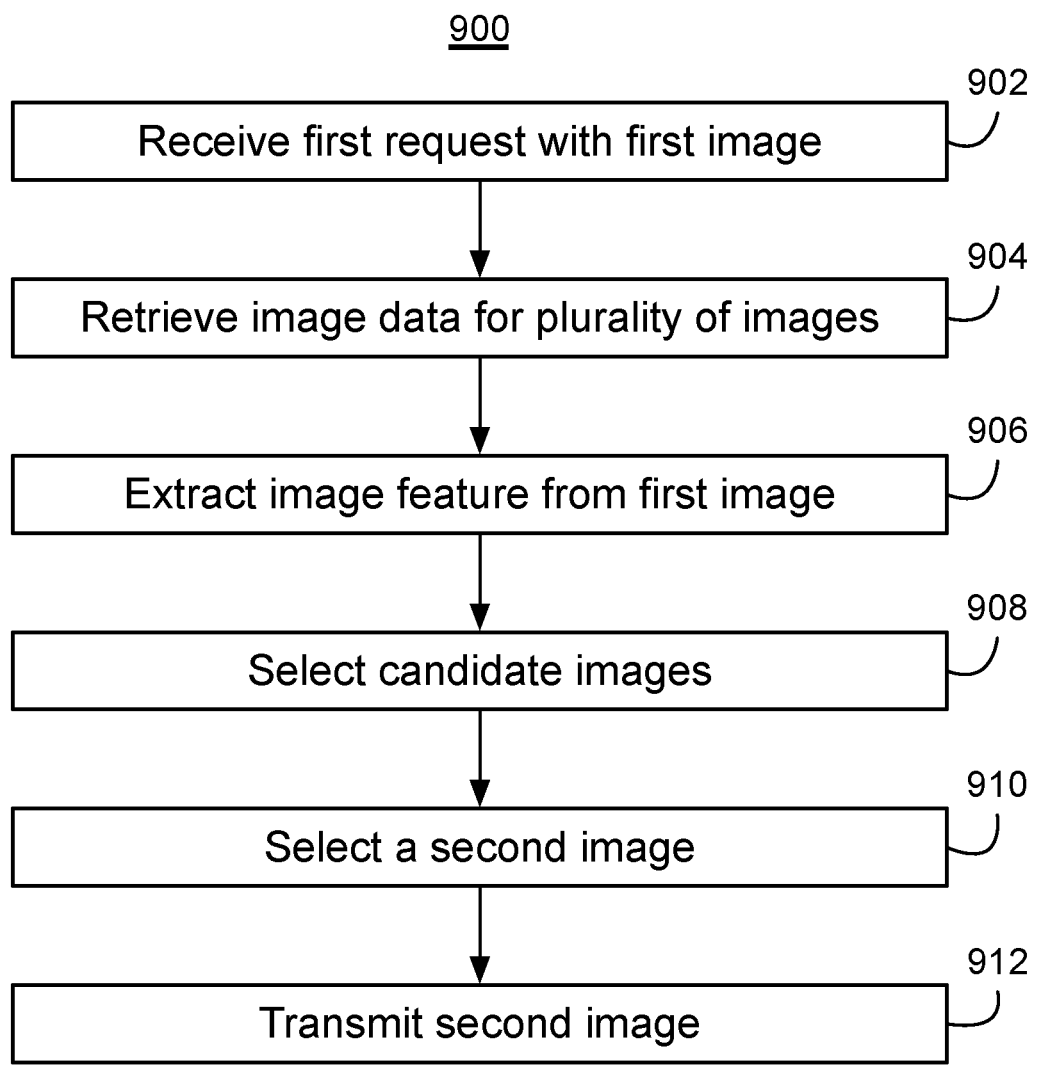
FIG. 9 illustrates a block diagram of an example method to extract image features from input requests.

FIG. 9 illustrates a block diagram of an example method 900 to extract image features from input requests. The method 900 can include receiving a first request that includes a first image (ACT 902). The method 900 can include retrieving image data for a plurality of images (ACT 904). The method 900 can include extracting an image feature from the first image (ACT 906). The method 900 can include selecting candidate images (ACT 908). The method 900 can include selecting a second image from the candidate images (ACT 910). The method 900 can include transmitting the second image (ACT 912).

The method 900 can include receiving a first request that includes a first image (ACT 902). The first image can be included in the request. The first image can be captured by a camera associated with the first computing device. For example, the computing device can include a built-in camera with which a user can capture an image. The first request can also include an audio-based input signal. For example, the audio-based input signal can be "Ok, what is this?" The audio-based input signal can be transmitted by the first computing device to the data processing system 102 with an image the user wants to know more information about. In some implementations, the NLP component 171 can also process the first image to determine requests that are associated with the first image. For example, the NLP component 171 can analyze a picture of an item and determine the request is to know where the item can be purchased. The first image can be a video image. The first image can be a frame or series of frames from a video input file. The video can be captured at the computing device.

The method 900 can also include receiving the request by the natural language processor component that is executed by the data processing system 102. The request can be received as a plurality of packets that are received via a packet based protocol. The natural language processor component can parse the request identify a trigger keyword in the request. For example, the request can include the input audio-signal "Ok, where can I buy this?". The trigger keyword in this example can be "buy," indicating the user may want to purchase the item contained in the first image that is received with the request.

The method 900 can include retrieving image data for a plurality of images (ACT 904). The method 900 can include retrieving the image data for each of the plurality of images. The method 900 can include retrieving content data from a plurality of content items. The content items can be digital components that can include other or additional types of content besides images. For example, the content items can include text, video, or audio content. The images data can include image features for of the respective images. The plurality of images can be digital components that the data processing system 102 can select from to provide to the first computing device in response to receiving the request.

The method 900 can include extracting an image feature from the first image (ACT 906). The recognition engine of the data processing system 102 can apply image feature detection to the first image to extract the image feature. The data processing system 102 can also use the recognition engine to apply the image feature detection to each of the plurality of images. The recognition engine can extract one or more image features from each of the images. The image features can include edges, corner features, interest points, blobs or regions of interest, or ridge features. The image features can be an identification of the subject matter contained in the images. For example, for an image of a shirt, the recognition engine can determine the image includes a shirt. The image features can also include identification of colors in the images. The recognition engine can use machine learning or computer vision to identify the images features of each of the images.

The method 900 can include selecting candidate images (ACT 908). The method 900 can include selecting the candidate images by determining matches between the image feature of the first image and the image features from each of the plurality of images. When the recognition engine identifies a plurality of image features for each of the images, the selection of the candidate images can be based on matching a predetermined number of the image features between the first image's image features and the image feature of the plurality of images. In one example, the image feature of the first image can be the identification that the first image represents or otherwise includes a purse. The recognition engine can select candidate images that also represent or otherwise include a purse. In some implementations, meta data, such as keywords associated with the plurality of images can also be used select the candidate images. For example, the data processing system 102 can select each of the plurality of images as candidate images that are tagged with the keyword "purse."

The method 900 can include selecting a second image from the candidate images (ACT 910). The second image can be selected based on the request from the computing device. The second image can also be selected from the candidate images based on the trigger keyword that was identified by the NLP component 171. In some implementations, the data processing system 102 can select a template based on the trigger keyword. The data processing system 102 can generate an action data structure. The data processing system 102 can populate fields in the template with the first or second images. The data processing system 102 can also request a value from a sensor associated with the computing device. The value can be used to select the second image. The value can be populated into an action data structure template. For example, the sensor can be a GPS sensor and the value can be a location. The action data structure can be generated by a direct action application programming interface.

The method 900 can include transmitting the second image (ACT 912). The second image can be transmitted to a second computing device. The second computing device can be a computing device that is associated with the first computing device. For example, the first and the second computing device can be linked through a user logging into a common account on each of the computing devices. The second image can be transmitted to the computing device by the data processing system 102 or by a service provider computing device.

In some implementations, the method 900 can include transmitting, by the direct action application programming interface, the action data structure to a service provider computing device to cause the service provider computing device to invoke a conversational application programming interface. The service provider computing device can establish a communication session between the service provider computing device and the first computing device. Through the communication session, the service provider computing device can request information from the computing device. The data processing system 102 can receive an indication that the service provider computing device established the communication session with the first computing device.

Although an example computing system has been described, the subject matter including the operations described in this specification can be implemented in other types of digital electronic circuitry, or in computer software, firmware, or hardware, including the structures disclosed in this specification and their structural equivalents, or in combinations of one or more of them.

For situations in which the systems discussed herein collect personal information about users, or may make use of personal information, the users may be provided with an opportunity to control whether programs or features that may collect personal information (e.g., information about a user's social network, social actions or activities, a user's preferences, or a user's location), or to control whether or how to receive content from a content server or other data processing system 102 that may be more relevant to the user. In addition, certain data may be anonymized in one or more ways before it is stored or used, so that personally identifiable information is removed when generating parameters. For example, a user's identity may be anonymized so that no personally identifiable information can be determined for the user, or a user's geographic location may be generalized where location information is obtained (such as to a city, postal code, or state level), so that a particular location of a user cannot be determined. Thus, the user may have control over how information is collected about him or her and used by the content server.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively, or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "data processing system" "computing device" "component" or "data processing apparatus" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. For example, the direct action API 116, content selector component 118, or NLP component 171 and data processing system 102 components can include or share one or more data processing apparatuses, systems, computing devices, or processors.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the data processing system 102) to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 100 or system 500 can include clients and servers. A client and server are generally remote from each other and typically interact through a communication network (e.g., the network 165). The relationship of client and server arises by virtue of computer programs running on the respective computers and having a client-server relationship to each other. In some implementations, a server transmits data (e.g., data packets representing a content item) to a client device (e.g., for purposes of displaying data to and receiving user input from a user interacting with the client device). Data generated at the client device (e.g., a result of the user interaction) can be received from the client device at the server (e.g., received by the data processing system 102 from the computing device 206 or the content provider computing device 222 or the service provider computing device 210).

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product. For example, the NLP component 171 or the content selector component 118, can be a single component, app, or program, or a logic device having one or more processing circuits, or part of one or more servers of the data processing system 102.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation.

Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. For example, a reference to "at least one of" 'A' and 'B' can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. For example, the data processing system 102 can select a content item or digital component for a subsequent action (e.g., for the third action) based in part on data from a prior action in the sequence of actions of the thread, such as data from the second action indicating that the second action is complete or about to begin. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A system to extract image features from input requests, comprising:
    a recognition engine executed by a data processing system comprising at least one hardware processor to:
        receive, from a computing device, a first request comprising a first query term and a first image that is different from the first query term;
        retrieve, from a data repository, content data for each of a plurality of content items, the content data comprising image features;
        extract an image feature from the first image, the image feature including at least one of an edge, a corner feature, or a ridge feature;
        select candidate content items from the plurality of content items based on matches between the image features of the plurality of content items and the at least one of the edge, the corner feature, or the ridge feature of the first image;
        select a content item from the candidate content items based at least in part on the first query term; and
    a network interface of the data processing system to transmit the content item to the computing device.

2. The system of claim 1, wherein the first image is captured by a camera associated with the computing device.

3. The system of claim 1, wherein the first request comprises an audio-based input signal.

4. The system of claim 1, comprising the recognition engine to:
    apply an image feature detection to the first image to extract the image feature; and
    apply the image feature detection to each of the plurality of content items.

5. The system of claim 1, comprising the recognition engine to:
    extract a plurality of image features from the first image;

extract a second plurality of image features from each of the plurality of content items; and select the candidate content items from the plurality of content items by matching a first predetermined number of the plurality of image features with a second predetermined number of the second plurality of image features.

6. The system of claim 1, comprising:

a natural language processor component executed by the data processing system to:
 receive data packets comprising the first request;
 parse the first request to identify a trigger keyword corresponding to the first request; and
 the recognition engine to select the content item from the candidate content items based on the trigger keyword.

7. The system of claim 1, comprising:

a direct action application programming interface executed by the data processing system to:
 generate an action data structure based on the first request;
 transmit the action data structure to a service provider computing device to cause the service provider computing device to invoke a conversational application programming interface and establish a communication session between the service provider computing device and the computing device; and
 receive an indication that the service provider computing device established the communication session with the computing device.

8. The system of claim 1, comprising:

a natural language processor component executed by the data processing system to:
 parse the first request to identify a trigger keyword corresponding to the first request;
the data processing system to:
 select a template based on the trigger keyword; and
 populate a field of the template with the first image.

9. The system of claim 8, comprising the data processing system to:
 request a value from a sensor associated with the computing device; and
 populate a second field of the template with the value.

10. The system of claim 8, comprising:
 the data processing system configured to generate, based on the template, an action data structure.

11. A method to extract image features from input requests, comprising:
 receiving, from a computing device by a data processing system, a first request comprising a first query term and a first image that is different from the first query term;
 retrieving, from a data repository by the data processing system, content data for each of a plurality of content items, the content data comprising image features;
 extracting, by a recognition engine executed by the data processing system, an image feature from the first image, the image feature including at least one of an edge, a corner feature, or a ridge feature;
 selecting, by the data processing system, candidate content items from the plurality of content items by determining matches between the image features of the plurality of content items and the at least one of the edge, the corner feature, or the ridge feature of the first image;
 selecting, by the data processing system, a content item from the candidate content items based at least in part on the first query term; and
 transmitting, via a network interface, the content item to the computing device.

12. The method of claim 11, wherein the first image is captured by a camera associated with the computing device.

13. The method of claim 11, wherein the first request comprises an audio-based input signal.

14. The method of claim 11, comprising:
 applying an image feature detection to the first image to extract the image feature; and
 applying the image feature detection to each of the plurality of content items.

15. The method of claim 11, comprising:
 extracting, by the recognition engine, a plurality of image features from the first image;
 extracting, by the recognition engine, a second plurality of image features from each of the plurality of content items; and
 selecting, by the data processing system, the candidate content items from the plurality of content items by matching a first predetermined number of the plurality of image features with a second predetermined number of the second plurality of image features.

16. The method of claim 11, comprising:
 receiving, by a natural language processor component executed by the data processing system, data packets comprising the first request;
 parsing, by the natural language processor component, the first request to identify a trigger keyword corresponding to the first request; and
 selecting, by the data processing system, the content item from the candidate content items based on the trigger keyword.

17. The method of claim 11, comprising:
 generating, by a direct action application programming interface, an action data structure based on the first request;
 transmitting, by the direct action application programming interface, the action data structure to a service provider computing device to cause the service provider computing device to invoke a conversational application programming interface and establish a communication session between the service provider computing device and the computing device; and
 receiving, by the data processing system, an indication that the service provider computing device established the communication session with the computing device.

18. The method of claim 11, comprising:
 parsing, by a natural language processor component, the first request to identify a trigger keyword corresponding to the first request;
 selecting, by the data processing system, a template based on the trigger keyword; and populating, by the data processing system, a field of the template with the first image.

19. The method of claim 18, comprising:
 requesting, by the data processing system from the computing device, a value from a sensor associated with the computing device; and
 populating, by the data processing system, a second field of the template with the value.

20. The method of claim 18, comprising:
 generating, based on the template, an action data structure.

* * * * *